United States Patent [19]

Ujita et al.

[11] Patent Number: 5,500,663
[45] Date of Patent: Mar. 19, 1996

[54] RECORDING INK CONTAINER WITH AN AIR VENT VALVE

[75] Inventors: Toshihiko Ujita, Yamato; Kazuhiro Nakajima; Yohei Sato, both of Yokohama; Shuichi Murakami, Tokyo, all of Japan

[73] Assignee: Canon Kabushiki Kaisha, Tokyo, Japan

[21] Appl. No.: 20,412

[22] Filed: Feb. 22, 1993

[30] Foreign Application Priority Data

| Feb. 24, 1992 | [JP] | Japan | 4-036263 |
| Mar. 13, 1992 | [JP] | Japan | 4-054901 |
| Jun. 5, 1992 | [JP] | Japan | 4-145585 |
| Jun. 30, 1992 | [JP] | Japan | 4-173236 |
| Jun. 30, 1992 | [JP] | Japan | 4-173258 |

[51] Int. Cl.⁶ .................................................. B41J 2/175
[52] U.S. Cl. ......................... 347/86; 137/858; 137/493.1
[58] Field of Search ........................ 346/140; 137/854, 137/855, 859, 852, 493.1; 347/85, 86, 87

[56] References Cited

U.S. PATENT DOCUMENTS

| 2,133,575 | 10/1938 | Rosenberg | 137/493.1 X |
| 2,935,075 | 5/1960 | Ringer | 137/493.1 X |
| 3,401,719 | 9/1968 | Rosser | 137/854 X |
| 3,592,302 | 7/1971 | Allinquant | 137/854 X |
| 3,799,427 | 3/1974 | Goglio | 137/854 X |
| 4,311,124 | 1/1982 | Hara . | |
| 4,345,262 | 8/1982 | Shirato et al. . | |
| 4,440,308 | 4/1984 | Baker | 137/855 X |
| 4,444,219 | 4/1984 | Hollenstein | 137/246 |
| 4,459,600 | 7/1984 | Sato et al. . | |
| 4,463,359 | 7/1984 | Ayata et al. . | |
| 4,514,742 | 4/1985 | Suga | 137/855 X |
| 4,558,326 | 12/1985 | Kimura | 347/86 |
| 4,558,333 | 12/1985 | Sugitani et al. . | |
| 4,608,577 | 8/1986 | Hori . | |
| 4,653,661 | 3/1987 | Buchner et al. | 220/209 |
| 4,723,129 | 2/1988 | Endo et al. | 347/56 |
| 4,740,796 | 4/1988 | Endo et al. | 347/56 |
| 4,760,937 | 8/1988 | Evezich | 222/95 |
| 5,040,002 | 8/1991 | Pollacek et al. | 347/87 |

FOREIGN PATENT DOCUMENTS

| 0052914 | 6/1982 | European Pat. Off. | B41J 3/04 |
| 0149695 | 7/1985 | European Pat. Off. | B65D 75/52 |
| 0336307 | 10/1989 | European Pat. Off. | F16K 15/14 |
| 0463849 | 1/1992 | European Pat. Off. | B41J 2/175 |
| 54-056847 | 5/1979 | Japan | B41M 5/26 |
| 55-000446 | 1/1980 | Japan | B65D 51/16 |
| 55-029723 | 2/1980 | Japan | F16K 23/00 |
| 55-029722 | 2/1980 | Japan | F16K 23/00 |
| 55-061665 | 4/1980 | Japan | F16K 24/00 |
| 56-053012 | 5/1981 | Japan | B65D 51/16 |
| 92072 | 7/1981 | Japan | B41J 3/04 |
| 59-123670 | 7/1984 | Japan | B41J 3/04 |
| 59-138461 | 8/1984 | Japan | B41J 3/04 |
| 60-071260 | 4/1985 | Japan | B41J 3/04 |
| 2-036464 | 8/1990 | Japan | B65D 33/01 |
| 1477766 | 6/1977 | United Kingdom | A61M 1/00 |
| 2253387 | 9/1992 | United Kingdom | B65D 83/00 |
| 9111641 | 8/1991 | WIPO | F16K 15/14 |
| WO9113003 | 9/1991 | WIPO | B65D 37/00 |
| 9206728 | 4/1992 | WIPO | A61M 16/00 |
| WO9221589 | 12/1992 | WIPO | B65D 83/00 |

*Primary Examiner*—Joseph W. Hartary
*Attorney, Agent, or Firm*—Fitzpatrick, Cella, Harper & Scinto

[57] ABSTRACT

A recording ink container having an air vent valve including a supporting means with a first opening, a first thin film with a second opening for covering the first opening, a second thin film for covering the second opening, and sealing means between the thin films. The valve functions to release air from the container through the first opening, and to permit the introduction of air into the container through the second opening with pressures of predetermined levels.

7 Claims, 35 Drawing Sheets

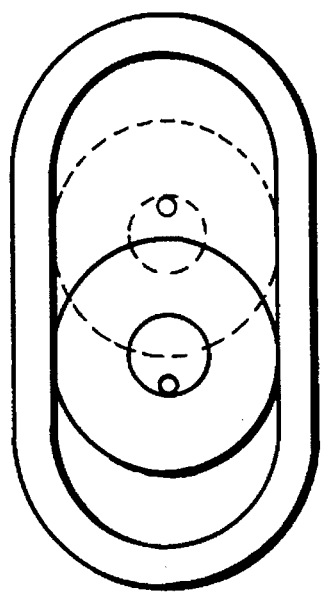 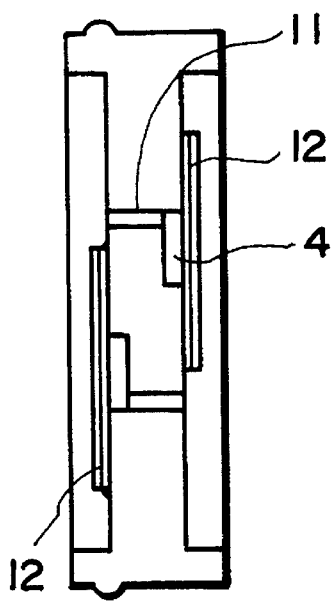
FIG. 3A    FIG. 3B
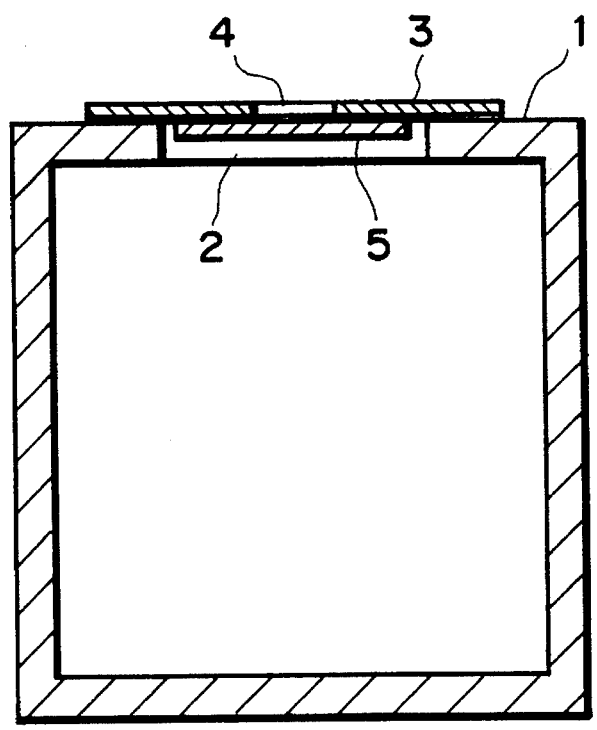
FIG. 4

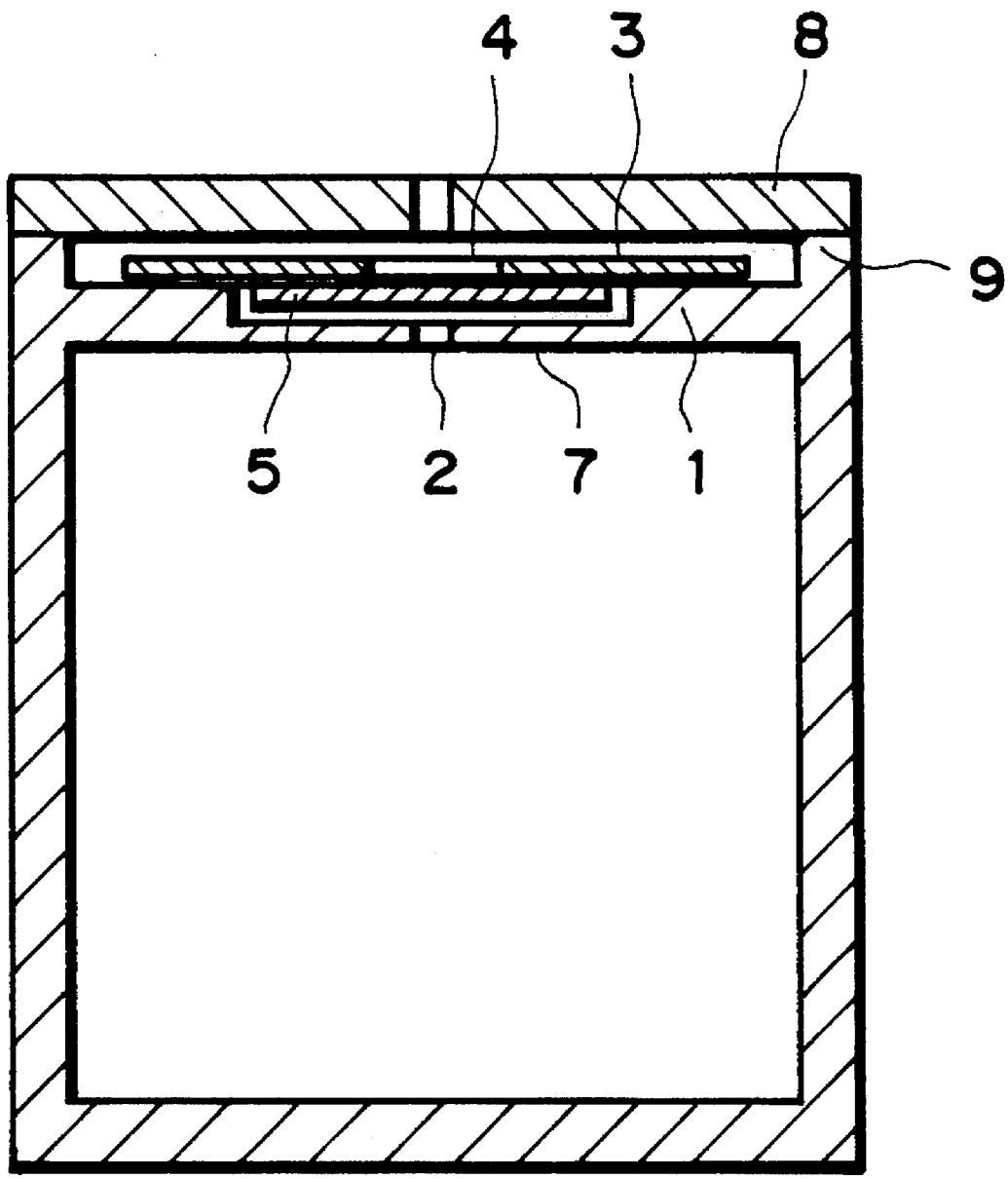
F I G. 10

RECORDING INK CONTAINER WITH AN AIR VENT VALVE

FIELD OF THE INVENTION AND RELATED ART

The present invention relates to a liquid container having an air vent valve, and more particularly, to a liquid container usable with an ink jet head cartridge, a writing element or device, a recording device, a copying machine or a facsimile machine or the like, having a valve mechanism for controlling the pressure.

Many proposals have been made as to a valve mechanism for preventing too high or low pressure in a container, while maintaining a sealed state of the container. The desirable function of such a valve is to maintain the closed state when there is no pressure difference between the inside and outside, to open at a predetermined threshold when the inside pressure increases or decreases, and to quickly return to the closed state. It is further desired that the threshold does not vary depending on the manufacturing conditions.

Japanese Utility Model Application Publication No. 446/1980 discloses as shown in FIG. 45A and 45B of this application, a slit formed in a rubber member of a cap of a container, with the slit opening upon internal pressure increase to release the inside gas. Such an air valve is simple in structure, but when there is no pressure difference between the inside and the outside, the closure of the valve is not well assured. In addition, the releasing threshold pressure significantly varies depending on small difference of the slit, so that the manufacturing is not easy, and the use thereof is limited.

Japanese Utility Model Application Publication No. 53012/1981, as shown in FIG. 46 of this application, proposes an air valve having a heat-fusing plastic resin material having a great number of fine openings having a diameter of 100–10000 Angstroms and having a water repelling nature. This valve does not permits leakage of liquid, and permit free flow of the gases, so that evaporation of the liquid cannot be prevented. Again, the use thereof is limited.

Japanese Laid-open Patent Application No. 36464/1990 discloses an air valve for a bag for containing coffee beans, in which carbon dioxide is produced. It is desired to maintain the closed state in the normal state, but permit the gas to be released to the outside upon pressure increase. Two films are concentrically bonded together, and an opening is formed in a basic one of the films. The gas is released through the opening and the clearance between the sheets (FIG. 47A and 47B). Between the flexible sheets, a sealing material such as silicone oil is applied. By the surface tension of the sealing oil, the closure of the valve is good when there is no pressure difference, and the releasing threshold pressure is stabilized. However, this valve functions only when the pressure is increased (unidirectional) When the internal pressure decreases, the valve does not open.

Japanese Laid-open Utility Model Application No. 29722/1980 discloses, as shown in FIG. 48, a bi-directional valve comprising a pair of valves in the opposite directions, each having a valve member and a coil spring for urging it. However, the structure is complicated with a great number of parts. It has been confirmed that the closing of the valve is not assured when the pressure difference is 0, with the threshold pressure set at not higher than 1000 Pa.

Japanese Laid-open Utility Model Application No. 29723/1980 discloses, as shown in FIG. 49, another bi-directional valve, which is more compact than the above, but the same problems are involved.

Japanese Laid-open Utility Model Application No. 61665/1980 discloses, as shown in FIG. 50, a bi-directional valve having a pair of symmetrical valves each having a dome elastic material with a slit at the top. Similarly to Japanese Utility Model Application Publication No. 446/1980, the closure of the valve when there is no pressure difference is not assured. In addition, the releasing threshold pressure significantly changes with small variations of the slit.

In a recording apparatus using liquid ink, size reduction is desired. In some of them, a recording head and ink container are carried on the printer carriage, or in some of them, only the ink container is exchanged upon using all of the ink. This is preferable in the size reduction and the simple construction as compared with the case in which the ink container is fixed on the main assembly of the printer and the ink is supplied to the recording head through a tube. In addition, the running cost can be reduced.

In the case that the liquid is supplied from a liquid supplier such as a liquid container to a liquid receptor such as a recording head, a static head is applied to the liquid in the liquid receptor, if there is a level difference between the liquid supplier and the liquid receptor. The influence of the static head is important in the field of the recoring.

For example, in the field of an ink jet recording apparatus in which the recording is effected with ink which is liquid, ink leakage, recording performance variations or improper image recoring result from the static head due to the level difference between the levels of the recording head and the ink container. To avoid this, the liquid surface of the ink container is placed at a level lower than that of the ink ejection outlets of the recording head, so that the ink pressure in the recording head is lower than the external pressure.

However, the negative pressure generation at the recording head requires a predetermined positional relation between the recording head and the ink container. This is a significant limitation of the apparatus.

Where the ink container is placed on the carriage, the size of the carriage increases because of the production of the negative pressure.

In an attempt to avoid the problem, a porous material is disposed in the container to retain the liquid therein, and the vacuum is produced using the capillary force. In another example, the ink is contained in a dome-like container. They have been put into practice.

However, in order to obtain a proper performance for the recording head, the density of the porous material has to be high, and therefore, the ink quantity to be contained becomes small. With the consumption of the ink, the capillary force increases, the vacuum produced extremely increases with the result that the ink supply becomes not possible, while a certain amount remains therein. In the case of a container using elastic material such as rubber, the vacuum increases with the consumption of the ink with the result of the same problem. So, the usable ink quantity is quite smaller than the volume to the ink container, that is, the use efficiency is low. When a certain quantity of the ink is desired to be contained, the size of the container has to a be much larger. This leads to bulky apparatus.

SUMMARY OF THE INVENTION

Accordingly, it is a principal object of the present invention to provide a valve mechanism for an air vent having a simple structure and having high reliability.

It is another object of the present invention to provide a recording head cartridge and recording apparatus usable with a recording liquid container having a reliable air vent mechanism.

According to an aspect of the present invention, there is provided a valve mechanism comprising: a supporting member having an opening for communication between separated spaces; a thin film covering the opening of the supporting member; and a confining member for confining a part of the thin film on the supporting member.

According to another aspect of the present invention, there is provided a valve mechanism comprising: a supporting means having a first opening; a first thin film, having a second opening smaller than the first opening, and for covering the first opening a second thin film, smaller than the first opening, for covering the second opening; wherein the first thin film is seated on the supporting means with a sealing material therebetween, and the second thin film is seated on such a side of the first thin film as is closer to the supporting means with the sealing material therebetween, within the first opening.

According to a further aspect of the present invention, there is provided a liquid container for containing liquid therein, comprising: a first container for containing the liquid; and a second container for containing the first container therein; a passage for supplying the liquid out from the first and second containers; wherein the second container is provided with a valve for controlling a pressure of the air between the first and second containers.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is an exploded perspective view of a valve mechanism according to an embodiment of the present invention.

FIG. 3A is a top plan view of a valve mechanism according to another embodiment of the present invention.

FIG. 3B is a sectional view of the valve mechanism according to the embodiment of the present invention.

FIG. 4 is a sectional view of a valve mechanism according to a further embodiment of the present invention.

FIG. 10 is a sectional view of a valve mechanism according to an embodiment of the present invention.

DESCRIPTION OF THE PREFERRED EMBODIMENTS

Referring to the accompanying drawings, embodiments of the present invention will be described.

FIG. 1 is an exploded perspective view of a valve mechanism according to an embodiment of the present invention, which comprises an air communication port 11, a pressure chamber 4 communicating with the communication port 11 ($t_2$=5 mm, for example), a thin film 12 (Mylar sheet, a single sheet although a few lines are drawn to show the thickness thereof, in the FIG.) ($t_1$=15 mm, $t_3$= 0.04 mm, for example) covering the pressure chamber, and a confining member (plate) 13 (T=5 mm, for example) for fixing the thin film to the body of the container. Between the thin film and the container body, sealing liquid 14 such as silicone oil or the like is provided to improve the sealing performance.

Figure 2A:
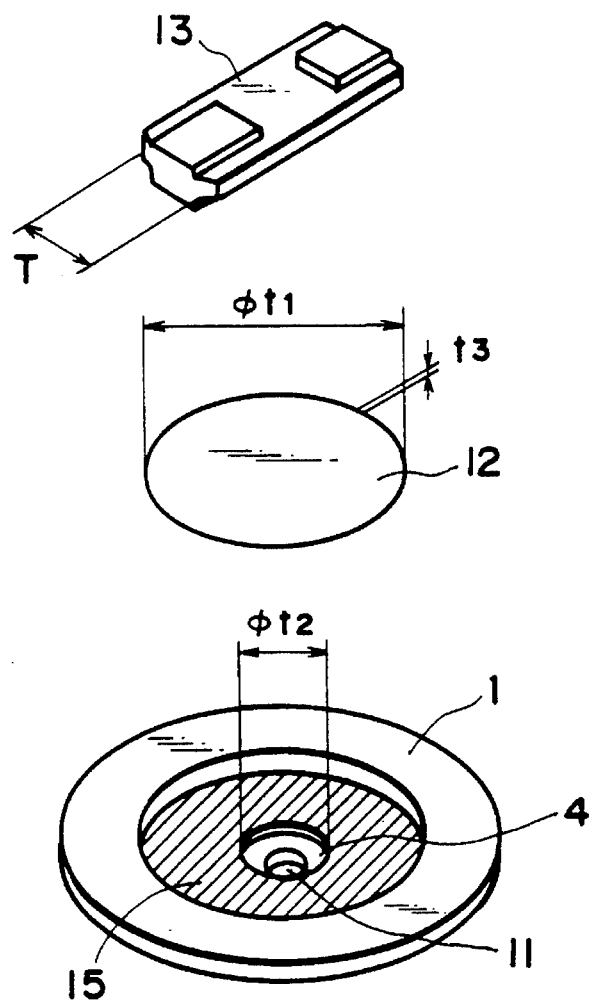
FIGS. 2A and 2B are sectional views of the valve mechanism according to the embodiment of the present invention.
Figure 2B:
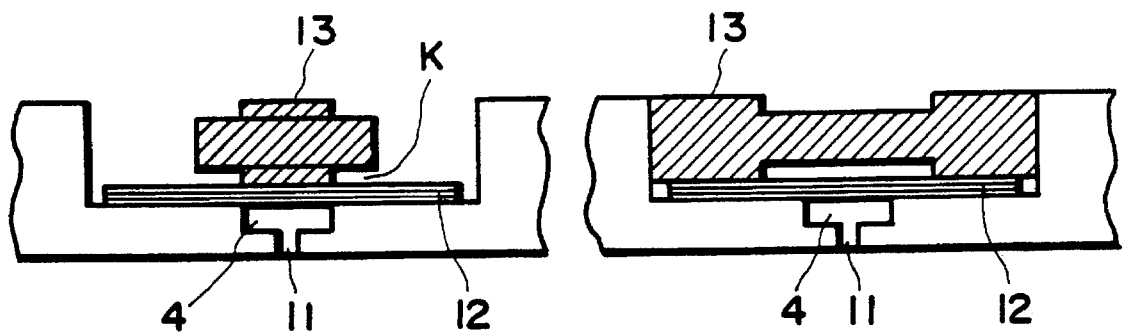

FIGS. 2A and 2B are sectional views along a length and width of the confining member. As shown in these FIGS., the thin film 12 is confined at positions which are symmetrical about the communication port 11, by the confining member 13. Thus, the portion covering the pressure chamber 4 is not confined. In the valve mechanism of this embodiment, the portion of the film not confined by the confining member is raised by the pressure transmitted to the pressure chamber 4 through the communication port 11, so that the gas is released through the communication port 11, the pressure chamber 4 and the clearance between the ink container body and the thin film. In this embodiment, the pressure chamber 4 has a sectional area which is larger than that of the communication port, but it may be the same or smaller than the communication port. However, in the case of the structure of this embodiment, the manufacturing process is simpler because what is required is to form a small diameter communication port in the container main body. In addition, the area of the opening contacted to the thin film influential to the operating pressure of the valve mechanism can be easily adjusted by the provision of the pressure chamber 4.

In this embodiment, in order to permit free rise of the film, and also to permit rise thereof with proper pressure, a part of the surface of the confining member (corner portions) are removed in a suitable range, as indicated by K in FIG. 2A.

The operating pressure of the valve mechanism is influenced by the area of sheet surface in the pressure chamber (the area onto which the pressure acts), area in which the sealing liquid is applied, material or diameter (area) of the thin film or sheet, a thickness thereof, material of the oil, range or area confined by the confining plate or the like. In this embodiment, the operating pressure can be easily adjusted by changing the pressure applying area, the thickness of the thin film and the viscosity of the sealing liquid, with the other parameters fixed.

Following Table 1 shows examples of relations between the operating pressure difference and the oil viscosity, the thickness of the film and the area (diameter) of the pressure applying part.

TABLE 1

| Fixed spec. | Operating pressures Film material | | unit: (mmAq) Mylar (thickness: 0.04 mm) | | |
|---|---|---|---|---|---|
| | Film Diameter Sealing liquid | | 15 (mm) Silicone oil | | |
| Acting portion (dia. mm) | ø5 | | ø7 | | |
| Oil viscosity (cst) | 1000 | 3000 | 6000 | | 6000 |
| Film thickness (µm) | 40 25 16 | 60 50 10 | 70 60 30 | 80 70 50 | 60 30 10 |

In this embodiment of the present invention, the operating pressure can be controlled by changing the area of the film, property of the sealing liquid and the diameter of the pressure application part, and the assembly of the valve mechanism is easy because of the number of parts is small.

The material of the thin film of the valve mechanism is not limited to the above-described Mylar sheet, but another material is usable if the deterioration with time is small, the material is not influenced by the sealing oil, and suitable elasticity is exhibited. Typical materials include aluminum, phosphor bronze, stainless steel (SUS) or another metal film; polyethylene (PE), polypropylene (PP), polyethylene terephthalate (PET), polyamide, polyester or another plastic film. The surface roughness thereof is preferably not more than 6.3 from the particular standpoint of the hermetical sealing.

Any sealing liquid is usable if it is non-volatile, but from the standpoint of stabilization of the valve performance, it preferably has a suitable temperature-viscosity property, durability against ambient condition change, and is not easily oxidized or wetted. Examples of such materials include polybutene, polybutane, Teflon oil or the like.

Referring to FIGS. 3A and 3B, another embodiment of the present invention will be described in which two such valve mechanisms are used to control bi-directional gas flows. FIGS. 3A and 3B are front and longitudinal sectional views of a valve unit according to this embodiment. In the valve unit of this embodiment, two valve mechanisms each having the structure of the foregoing embodiment are used. The same reference numerals as in the foregoing embodiment are assigned to the corresponding functions, and the detailed description thereof is omitted for simplicity.

According to this embodiment, the plural valves are constituted into one unit, and therefore, even in the case that the valve mechanism can not be directly mounted to the container because of the configuration thereof or the like, the valve unit 19 may be assembled as a separate member, and can be mounted thereto. This permits a higher design latitude for the container without difficulty. In addition, even if the liquid container has a complicated configuration, what is required is only to use this valve unit, and therefore, the design work is easy and short, and the manufacturing and designing can be carried out more efficiently.

In the foregoing embodiment, the valve mechanism is easy to manufacture and to finely control the operating pressure. However, for the bi-directional flow control, two valve mechanisms are used, and therefore, further improvement is desirable for the bi-directional flow control.

Figure 5:
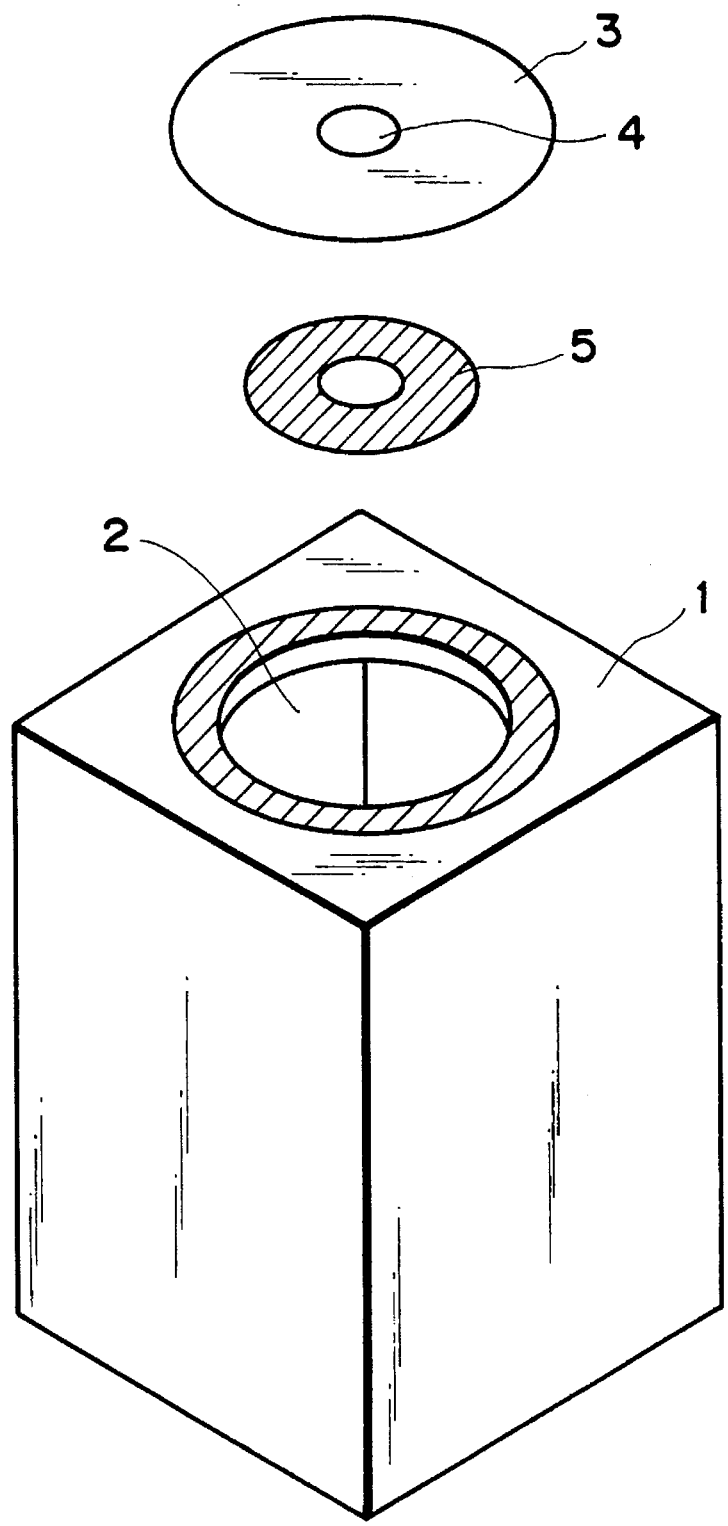
FIG. 5 is an exploded perspective view of the valve mechanism.
Figure 6:
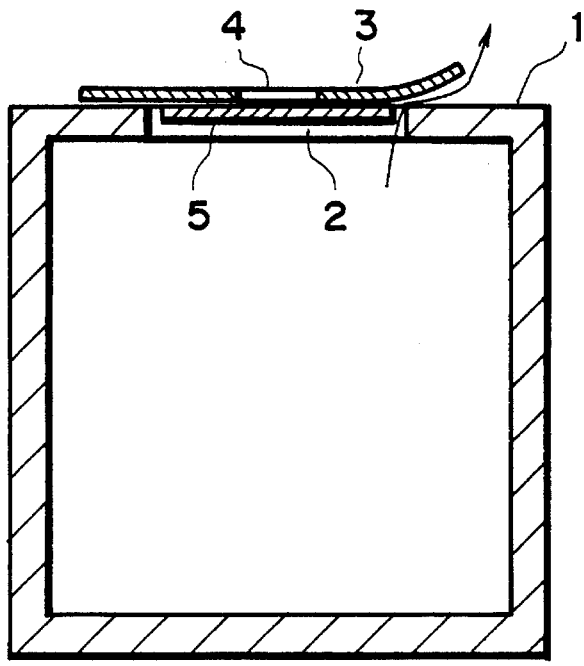
FIG. 6 is a sectional view of the valve mechanism illustrating operation thereof.
Figure 7:
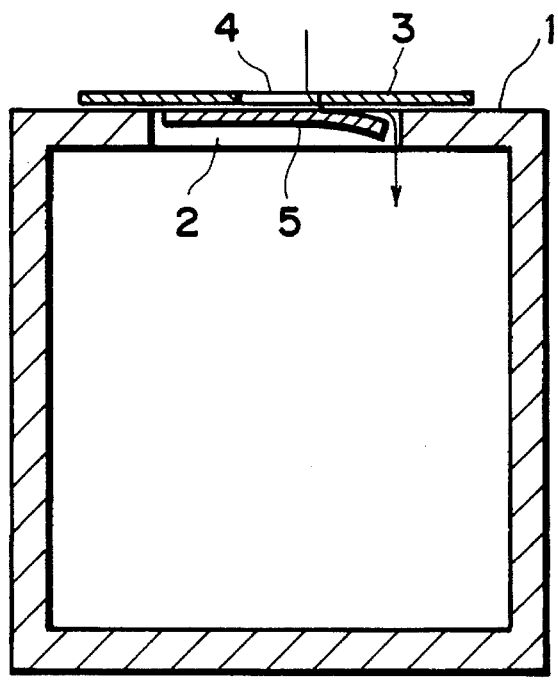
FIG. 7 is a sectional view of the valve mechanism illustrating operation thereof.

Referring to FIGS. 4 and 5, a further embodiment of the present invention will be described in which the valve mechanism has the above-described advantageous effects and the size can be further reduced. FIG. 4 is a sectional view of a bi-directional air vent mechanism, and FIG. 5 is an exploded perspective view of the same. FIG. 6 illustrates the flow of the gas when the internal pressure is higher than the external pressure. FIG. 7 shows the introduction of the air when the internal pressure is lower than the external pressure.

In FIG. 4, a supporting portion 1 which is a part of the external wall of the container is provided with a circular first opening. The opening 2 is covered with a combination of a first circular thin film 3 and a second circular thin film 5 having a diameter smaller than that of the first thin film, so that they are concentric with the opening 2.

The thin film 3 is provided with a second opening 4 at the center thereof. The diameter thereof is smaller than that of the thin film 5. The thin film 5 is contacted to cover the opening 4 of the thin film 3, and it is smaller than the opening of the supporting portion 1 and is received in the opening 2 thereof. The supporting portion 1, the thin film 3 and the thin film 5 are closely contacted by sealing liquid (sealing means) such as silicone oil or the like. A proper quantity of the sealing liquid is applied to the hatched region in FIG. 5 so that sufficient contact force is produced, and in addition, the container is closed when there is no pressure difference between outside and inside of the container.

The sealing liquid is non-volatile, as described in the foregoing embodiment. It is preferably has a viscosity of 1000–5000 cst. Further preferably, the property such as viscosity thereof is less influenced by temperature change.

Referring to FIGS. 6 and 7, operation of the valve of this embodiment will be described. When the internal pressure of the container increases relative to the external pressure thereof, the thin films 3 and 5 are raised toward the outside of the container. At this time, the thin film 5 is urged to the thin film 3, and therefore, the opening 4 of the thin film 3 is maintained closed by the thin film 5.

When a predetermined pressure difference is reached, the sealing liquid between the thin film 3 and the supporting portion 1 is partly released, so that an open flow path is established, as shown in FIG. 6.

When, on the contrary, the internal pressure reduces relative to the external pressure, the thin film 3 is urged to the supporting portion 1, and therefore, the contact portion between the supporting portion 1 and the thin film 3 is maintained closed. On the other hand, the thin film 5 is pressed by the pressure through the opening 4 of the thin film 3. When the pressure difference reaches a predetermined level, the sealing liquid between the thin film 3 and the thin film 5 is opened, so that a flow passage is established as shown in FIG. 7. When the inside vacuum reduces by the release, the valve is quickly closed by the elasticities of the thin films 5 and 3 and the surface tension of the viscous sealing liquid therebetween.

The threshold pressure for the opening of the bi-directional air vent valve can be controlled by some factors. For example, the opening pressure threshold when the internal pressure increases as shown in FIG. 6, may be determined by the contact area between the supporting portion 1 and the thin film 3, an area of the opening 2, and viscosity and surface tension of the elastic viscous sealing material. By suitably controlling these parameters, the opening threshold pressure can be adjusted.

On the other hand, the opening threshold pressure when the internal pressure decreases, as shown in FIG. 7, is determined by the contact area between the thin film 3 and the thin film 5, an area of the central opening 4 of the thin film 3, the elasticity of the thin film 5, and viscosity and surface tension of the sealing material between the thin film 3 and the thin film 5. By suitably controlling these parameters, a desired opening pressure threshold can be determined.

Referring to FIGS. 4 and 5, the description will be made as to the manufacturing of a container having the bi-directional air vent according to this embodiment of the present invention. In FIGS. 4 and 5, the container is made of polypropylene resin material and has a surface 20 mm×20 mm having the air vent valve, a length in a perpendicular direction of 40 mm, and all a wall thickness of 1 mm. The wall having the air vent is provided with an opening 2 having a diameter of 9 mm. A polyethylene terephthalate (PET) film (trade name: Embred available from Yunichika Kabushiki Kaisha, Japan) having a thickness of 25 microns and a diameter of 10 mm and also having a concentric opening of a diameter of 2 mm, and a circular film of the same material having a diameter of 8 mm, are assembled as shown in FIG. 5, using silicone oil (trade name: TSF-3000, available from Shinetsu Kagaku Kabushiki Kaisha, Japan).

A pump is connected to this container, and a pressure sensor is placed in the inside of the container. The pressure change is measured while sucking or injecting the air. When the air is injected, the valve opened when the internal pressure is approx. 300 Pa higher than the external pressure, and it is quickly closed. When the air injection is repeated, the opening and closing actions are repeated. On the other hand, when the air was sucked out, the valve opened when the internal pressure became approx. 600 Pa lower than the external pressure, and the valve was quickly closed. When the sucking operation was continued, the above actions were repeated.

Figure 8:
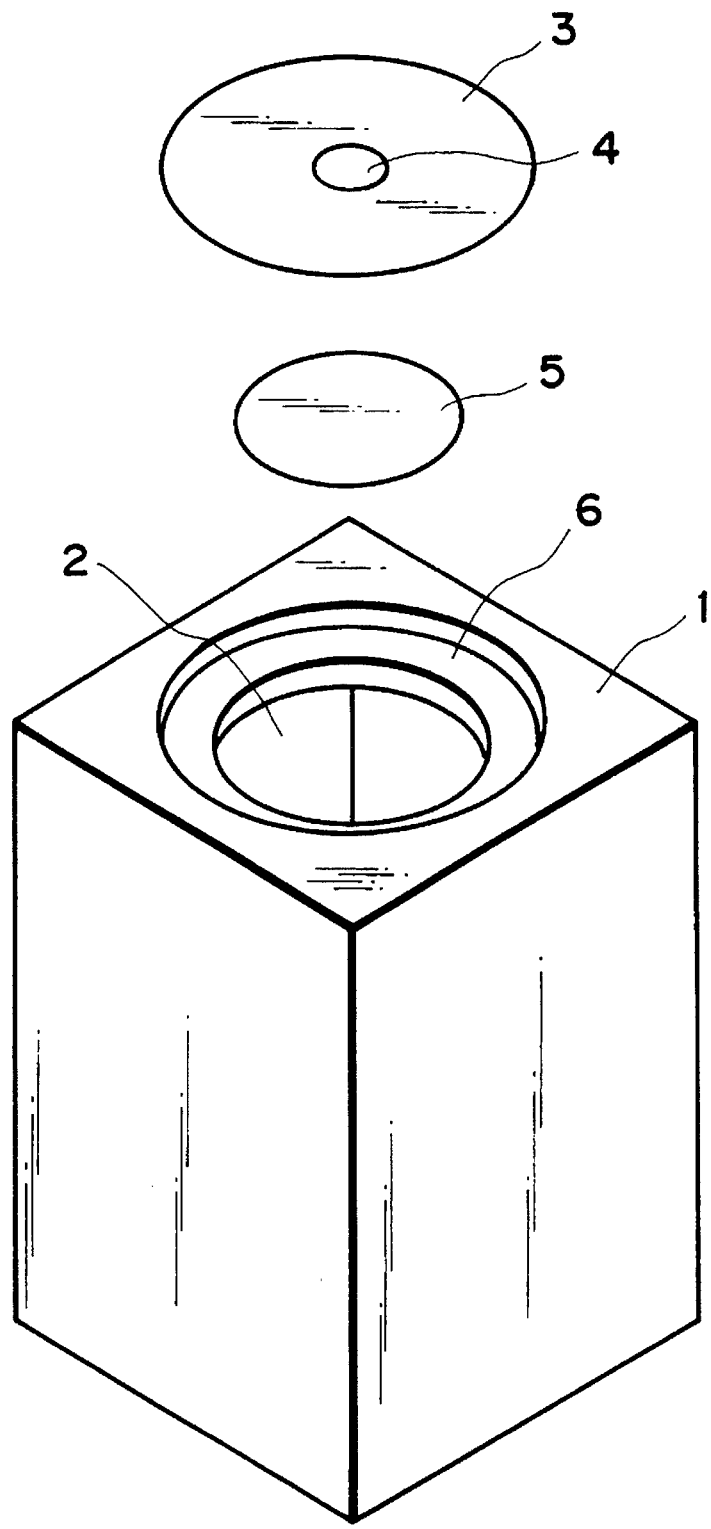
FIG. 8 is an exploded perspective view of a valve mechanism according to an embodiment of the present invention.

Referring to FIG. 8, a further embodiment of the present invention will be described. FIG. 8 is an exploded perspective view of a bi-directional air valve mechanism of this embodiment. In FIG. 8, there is provided a circular portion 6 around the supporting portion 1 on which the thin film 3 is mounted to prevent deviation, in addition to the elements in the foregoing embodiment. The external dimensional and material of the container and the dimensions and material of the thin film are the same as in the foregoing embodiment. The diameter of the deviation preventing portion 6 is 15 mm, and the thin film 3 having a diameter of 14 mm is accommodated in the stepped portion.

By the provision of the preventing portion 6, the positional deviation of the thin film 3 due to the repeated operation can be prevented, and therefore, the reliability of the valve mechanism increases. When the valve mechanism is assembled, the thin film 3 can be easily correctly positioned, and therefore, the manufacturing becomes easy.

Figure 9:
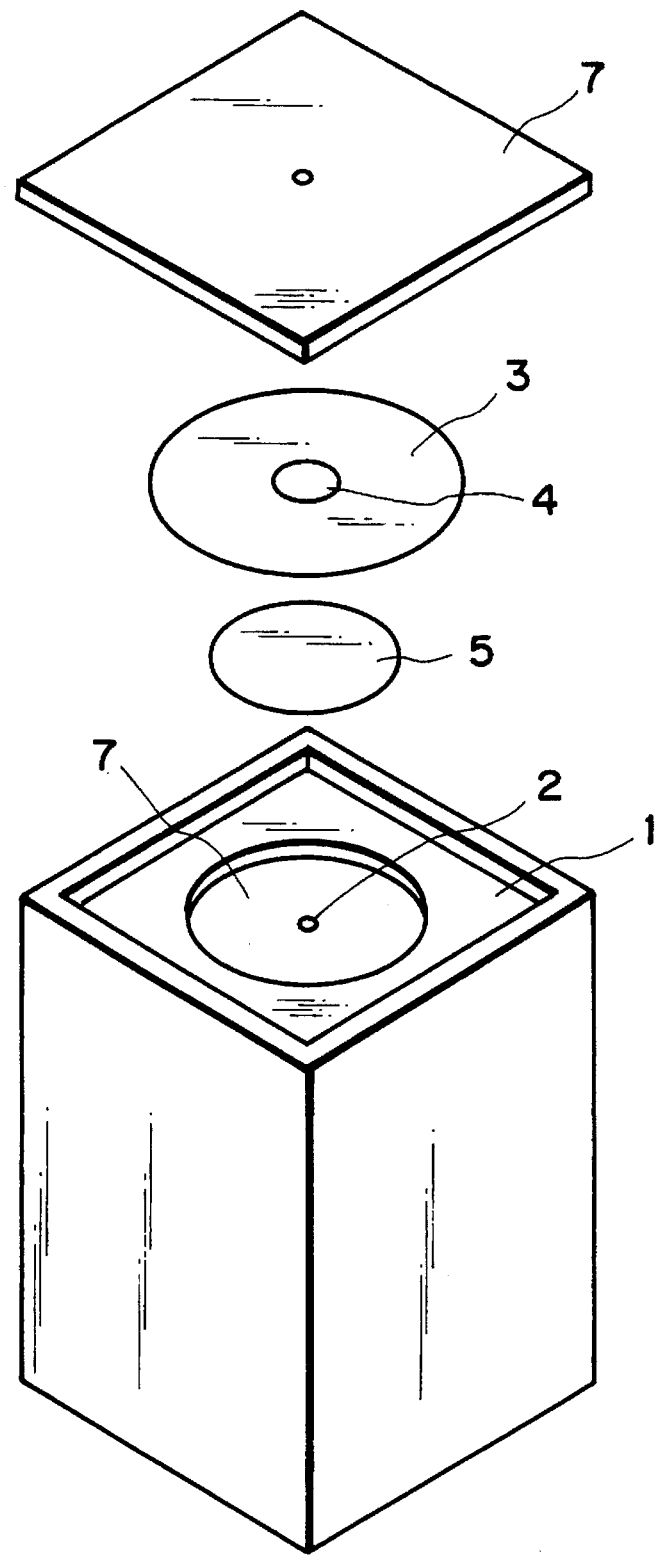
FIG. 9 is an exploded perspective view of a valve mechanism according to an embodiment of the present invention.

Referring to FIG. 9, a bi-directional air vent valve mechanism according to a further embodiment of the present invention will be described. FIG. 9 is an exploded perspective view of the valve mechanism of this embodiment.

In FIG. 9, a protection member 7 and a cover 8 were provided at such outside and inside position of the air vent or air valve as is not contacted to the thin film. FIGS. 10 and 9 are side sectional views after being assembled. In FIG. 10, a protection member 7 extends over the opening 2 of the supporting member 1, and the air flows through the gap between the protection member 7 and the opening 2. In addition, a wall 9 is provided along the outer configuration of the container around the supporting portion 1, and a protection cover 8 is provided thereabove which is bonded by bonding material or the like.

In this embodiment, the air valve has the same dimensions as in the foregoing embodiment. The gap between the protection member 7 and the thin film 5 was 0.5 mm, and the gap between the thin film 3 and the cover 8 was 0.8 mm. The valve is evaluated in the same manner as in the foregoing embodiment, and the results were substantially the same.

According to this embodiment, the thin film means of the air valve is not accessed from the outside of the container, and therefore, is substantially free of introduction of foreign matters. In addition, the content of the container is prevented from contacting the thin film in such a manner as to obstruct the operation of the air valve. Therefore, the structure is practical. The structure of the protection member 7 is not limited to the above-described structure. However, any structure is usable if the gas flow is assured without obstruction to the operation of the thin film 5, that is, if it is larger than the diameter of the thin film 5 and has a recess having a sufficient depth not to obstruct the operation of the valve. The structure of the cover 8 is not limited to the above-described, but it may be any if the gap is assured so as not to obstruct the operation of the thin film 3. The structure of this embodiment for covering the thin film, is usable for any of the foregoing embodiments.

Figure 11:
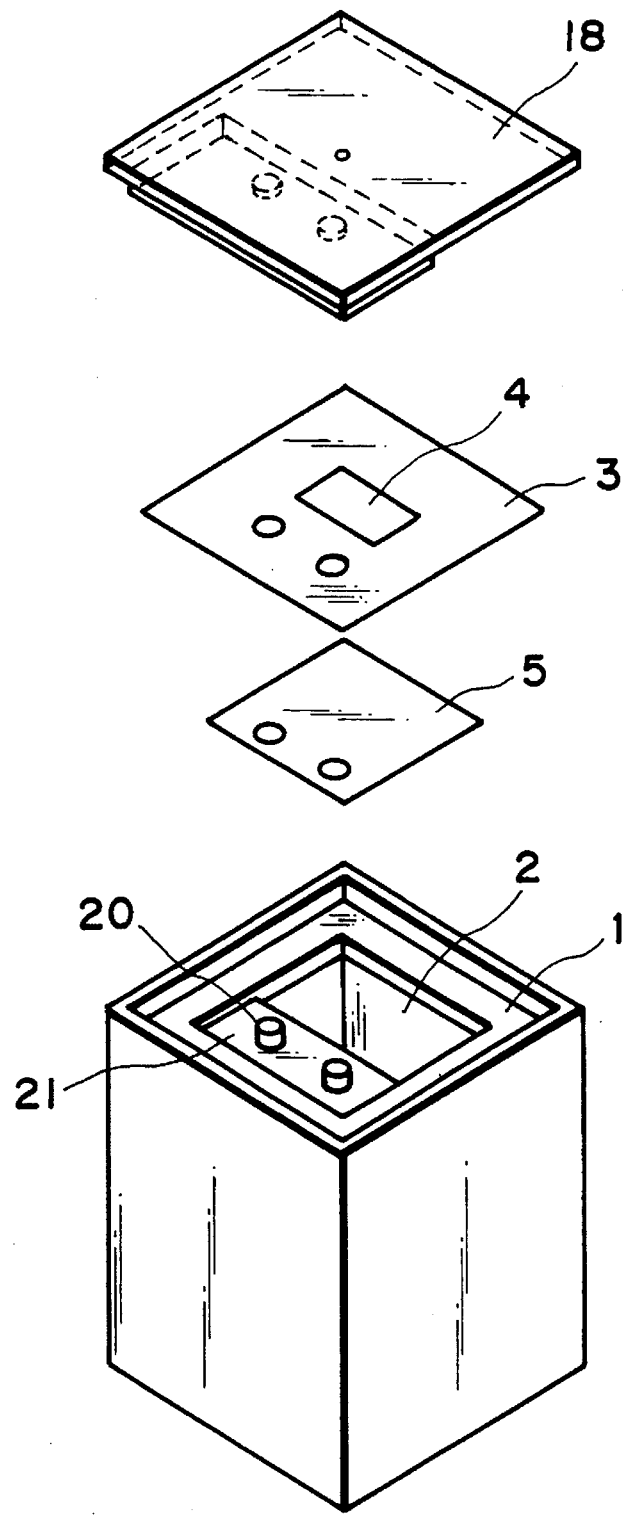
FIG. 11 is an exploded perspective view of a valve mechanism according to an embodiment of the present invention.

Referring to FIG. 11, a valve mechanism according to a further embodiment of the present invention will be described. FIG. 11 is an exploded perspective view of a bi-directional air valve according to this embodiment.

In this Figure, the opening 2 of the supporting member 1 is square or rectangular, and there are cylindrical projections adjacent one side of the opening 2. The projection 20 extends from a base which is slightly lowered as shown in the Figure from the surface of the supporting portion. The thin film 5 has a dimension to be received by the opening 2 of the supporting member 1 and has holes corresponding to the projections 20. The thin film 3 has a dimension sufficient to cover the opening 2 of the supporting portion 1 and has an opening 4 substantially at the center thereof and also has holes corresponding to the projections 20. The holes of the thin films 3 and 5 are set to the projections. The contact surfaces are coated with the sealing material such as silicone oil.

At this time, the opening 4 of the thin film 3 is completely closed by the thin film 5, and the thin film 3 is so constructed as to cover the opening 13 of the supporting member 1 and the lowered portion or recess 21. Similarly to the foregoing embodiment, in order to prevent the erroneous operation due to the external foreign matter, a cover 18 is used. According to this embodiment, the possible deviation of the thin film 3 and the possible deviation of the thin film 5 can be prevented.

In the foregoing embodiment, the fine adjustment of the operation is possible, and the manufacturing is easy. In the embodiment which will be described in the following, the stability of the operation is further improved.

Figure 12:
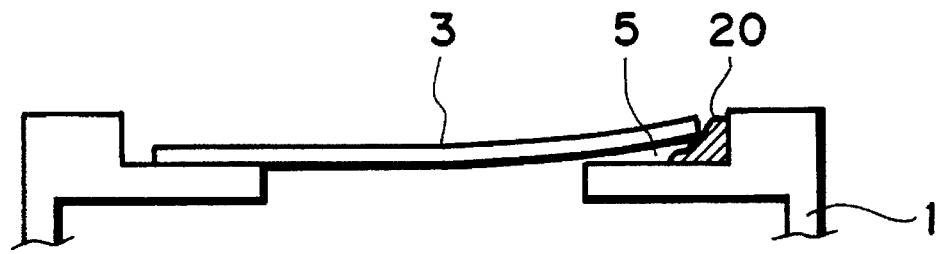
FIG. 12 is a sectional view of a valve mechanism.
Figure 13:
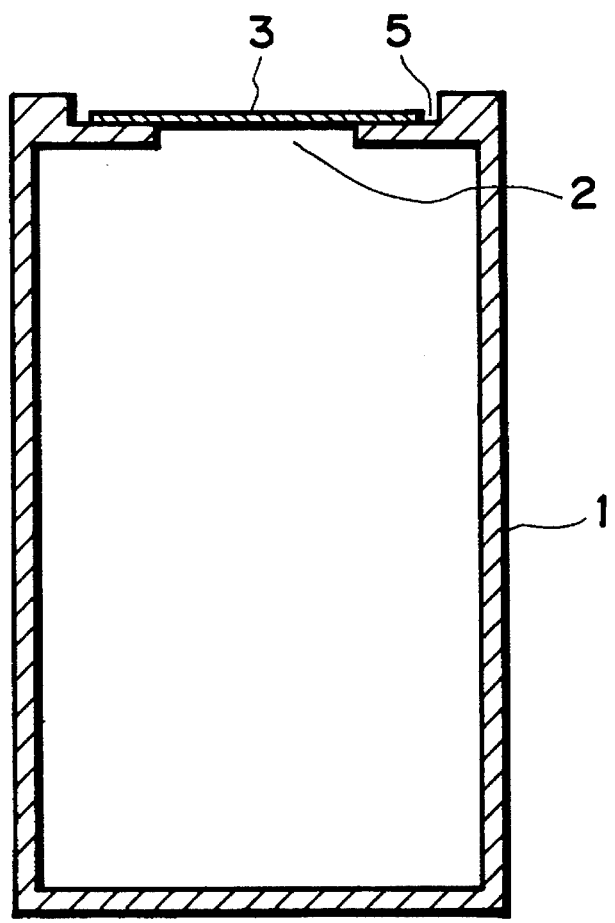
FIG. 13 is a sectional view of a valve mechanism according to a further embodiment of the present invention.
Figure 14:
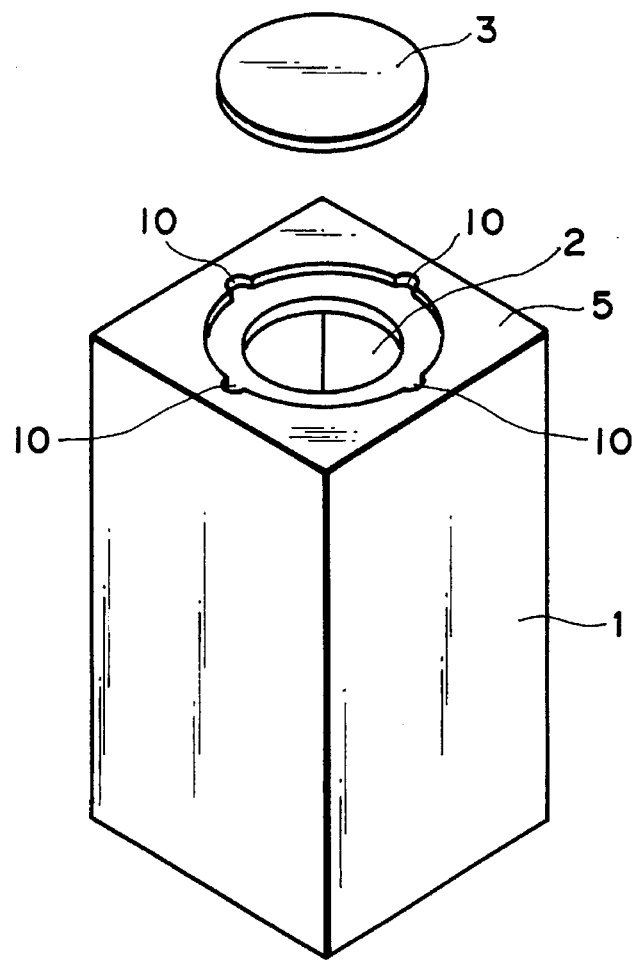
FIG. 14 is an exploded perspective view of a valve mechanism according to an embodiment of the present invention.

In the foregoing valve mechanisms, the sealing material is applied between the thin film and the container or the protection member to enhance the sealing property. With repetition of the opening and closing operation of the valve mechanism, the sealing material may be deposited on the internal wall of a recess of the container. This is because when the air is released to the outside by the internal pressure, the sealing material is pushed to the inside surface of the wall by the released air at the position where the thin film 3 is raised to provide the releasing passage. If this occurs, the outer edge of the thin film 3 may be kept raised by contact with the top of the sealing material 20 deposited on the inner surface of the wall, as show in FIG. 12. In this case, the thin film 3 of this portion is not contacted to the recess 5, so that the communicating state between the inside and outside of the container is kept. This means that the valve mechanism does not operate correctly. Referring to FIG. 13, a further embodiment of the present invention solving the above problem will be described. FIG. 13 is a sectional view of a valve according to this embodiment. FIG. 14 is an exploded perspective view of the valve of FIG. 13.

The container 1 is made of polypropylene resin material, and the dimension of the side having the air vent is 20 mm×20 mm, and the length in the direction perpendicular to the side is 40 mm, and the thickness of all of the wall portions is 1 mm. The side having the air valve is provided with an opening 2 having a diameter of 9 mm. A recess 5 having a diameter of 15 mm and a depth of 1 mm is formed around the opening 2. The thin film 3 has a thickness of 25 microns and a diameter of 14 mm and is made of polyethylene terephthalate (PET) film (trade name: Embred available from Yunichika Kabushiki Kaisha, Japan). The thin film 3 is mounted to the bottom surface of the recess 5 so as to cover the opening 2, using silicone oil (TSF-3000, available from Shinetsu Kagaku Kabushiki Kaisha) as shown in FIG. 13. The inside surface of the recess 5 is provided with four cut-away portions 10 at regular intervals, wherein the cut-away portion 10 is a part of a circle having a diameter of 1 mm.

The container 1 of this embodiment is connected with a pump through an unshown opening, and a pressure sensor is placed in the container. The pressure change was detected while injecting the air into the container, and the valve mechanism is evaluated. As a result, when the air was injected, the valve opened when the internal pressure becomes approx. 300 Pa higher than the external pressure, and it quickly closed. When the injection was continued, the actions were repeated. The pressure at the instance when the valve opens is called releasing threshold pressure, and the pressure at the instance when the valve is closed is called closing threshold pressure.

The following has been observed. The thin film 3 vents at the portions corresponding to the cut-away portions 10, and then, the silicone oil gradually moves. The moved silicone oil is collected into the cut-away portions 10, and therefore, the thin film 3 is prevented from being kept raised by the silicone oil.

Figure 15:
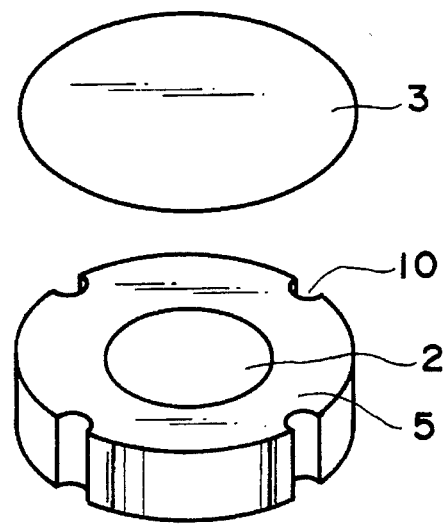
FIG. 15 is a perspective view of a valve mechanism according to a further embodiment of the present invention.

In this embodiment, a recess is provided to receive the thin film 3 with the silicone oil therebetween. However, as shown in FIG. 15, the contact portion may be in the form of projections, and the cut-away portion is provided around the projections.

Figure 16:
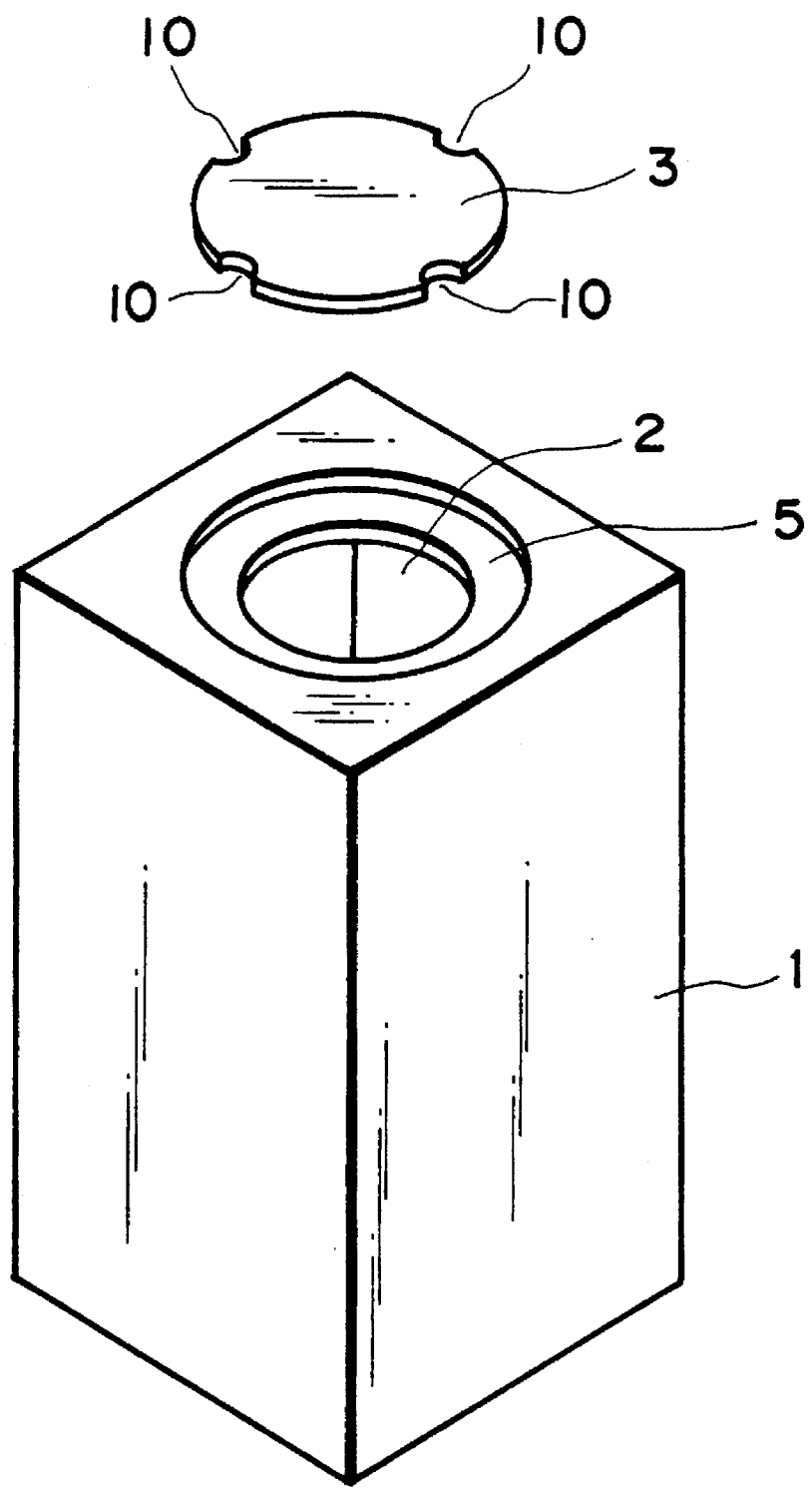
FIG. 16 is an exploded perspective view of a valve mechanism according to an embodiment of the present invention.

Referring to FIG. 16, a further embodiment of the present invention will be described. FIG. 16 is an exploded perspective view of the valve mechanism according to this embodiment. In the foregoing embodiment, the cut-away portion 10 is formed in the recess 5. In this embodiment, the circumferential periphery of the thin film 3 is provided with cut-away portions.

The cut-away portion 10 is a part of a circle having a diameter of 10 mm. The cut-away portion 10 is provided at four peripheral positions of the thin film 3. The operation is observed, and it has been confirmed that similarly to the foregoing embodiment, the silicone oil is corrected to the portion corresponding to the cut-away portion 10 of the bottom surface of the recess 5, and therefore, the opening and closing of the thin film 3 is not obstructed due to the deposition of the silicone oil on the inside surface of the recess 5.

In addition, when the valve opens, the thin film is raised at the position of the cut-away portions, and the inside of the container communicates with the outside through the cut-away portions 10. Since the distance between the cut-away portion 10 and the opening 2 is short, and therefore, the releasing threshold pressure is as low as 250 Pa. Particularly, the initial valve opening level can be made lower than in the conventional valve.

The closing and opening threshold pressures are determined in accordance with the area of the cut-away portions 10, the configurations thereof and the number thereof. Therefore, the required releasing threshold pressure and the closing threshold pressure, are properly determined by changing these parameters with fine adjustment.

Figure 17:
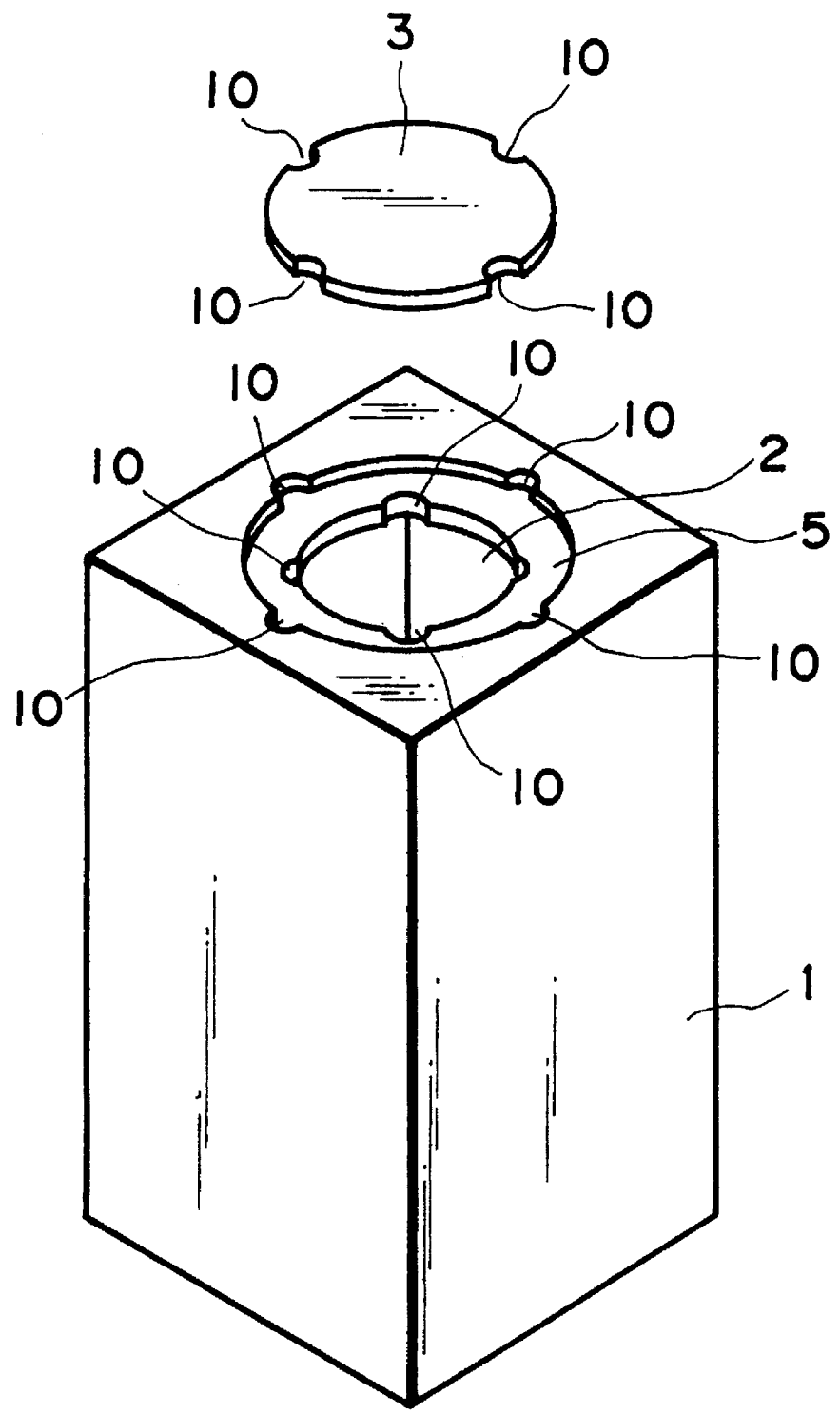
FIG. 17 is an exploded perspective view of a valve mechanism according to an embodiment of the present invention.

FIG. 17 is an exploded perspective view of a valve mechanism according to a further embodiment of the present invention.

In this embodiment, four cut-away portions 10 are formed in an inside surface of the recess 5 and the inside surface of the opening 2, respectively, as in the foregoing embodiment. In addition, the circumferential periphery of the thin film 3 is provided with four cut-away portions.

By the provision of the cut-away portions 10 in the inside wall of the recess and the thin film 3 and the internal wall of the opening 2, the obstruction of the valve opening attributable to the stagnated silicone oil can be avoided. In addition, the opening action is stabilized, and the releasing threshold pressure is further lower than in the foregoing embodiment.

Figure 18:
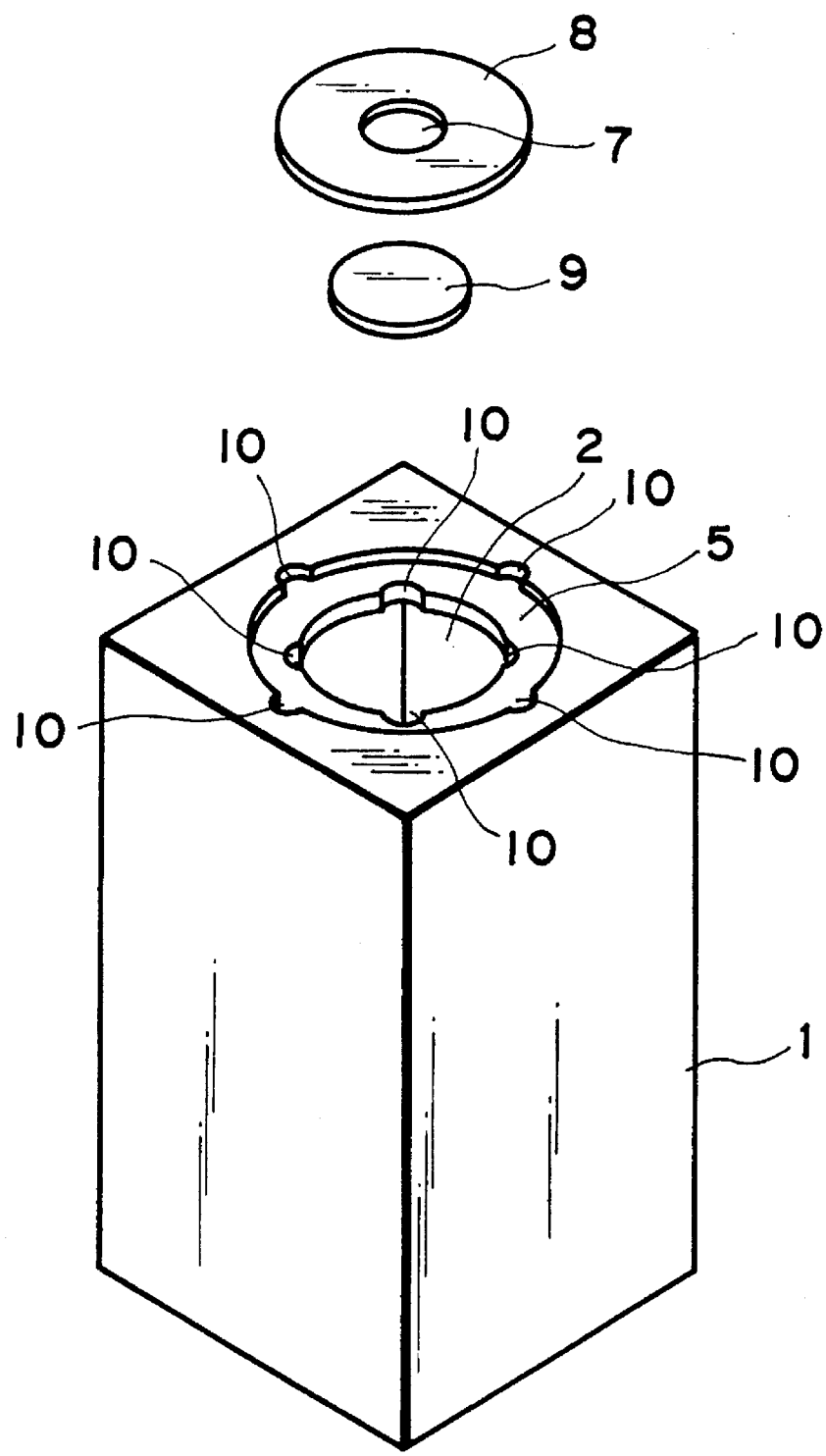
FIG. 18 is a valve mechanism according to a further embodiment of the present invention.

FIG. 18 is an exploded perspective view of the valve mechanism according to yet a further embodiment of the present invention. The valve mechanism is also a bi-directional type.

In FIG. 18, the container 1 is made of polypropylene resin material, and the dimensions thereof are as follows. The side having the air valve is 20 mm×20 mm and a length orthogonal to the side is 40 mm, and the thickness of all of the walls is 1 mm. A recess 5 having a depth of 1 mm and a diameter of 15 mm is formed around the opening 2. A thin film 8 has a thickness of 25 mm and a diameter of 14 mm and is made of polyethylene terephthalate (PET) film (Embret) provided with a concentric opening 7 having a diameter of 2 mm. These thin films 8 and 9 are mounted to the bottom surface of the recess 5 so as to cover the opening, as shown in FIG. 18, using (TSF-3000, available from Shinetsu Kagaku Kabushiki Kaisha) to provide a bi-directional valve. The recess 5 and the opening 2 are provided with respectively four cut-away portion in the form of a part of a circle having a diameter of 1 mm.

The container having the valve mechanism according to this embodiment is connected with a pump through an opening not shown, and a pressure sensor is placed in the container. The pressure change was measured while sucking and injecting the air. As a result, when the air was injected, the valve opened when the internal pressure becomes approx. 250 Pa higher than the external pressure, and it was quickly closed. When the injection was continued, the actions were repeated. When, on the other hand, the inside air was sucked out, the valve opened when the internal pressure becomes approx. 500 Pa lower than the external pressure, and it was quickly closed. When the sucking operation was continued, the actions were repeated.

The cut-away portions 10 function as escapes for the silicone oil, and the obstruction to the closing and opening of the thin film 8 attributable to the stagnation of the silicone oil at the internal wall of the recess 5, was avoided. With respect to the thin film 9, the cut-away portion 10 provides the escape for the silicone oil, and therefore, the obstruction to the opening and closing action of the air valve attributable to the deposition of the silicone oil to the outer periphery of the opening was properly avoided.

Figure 19:
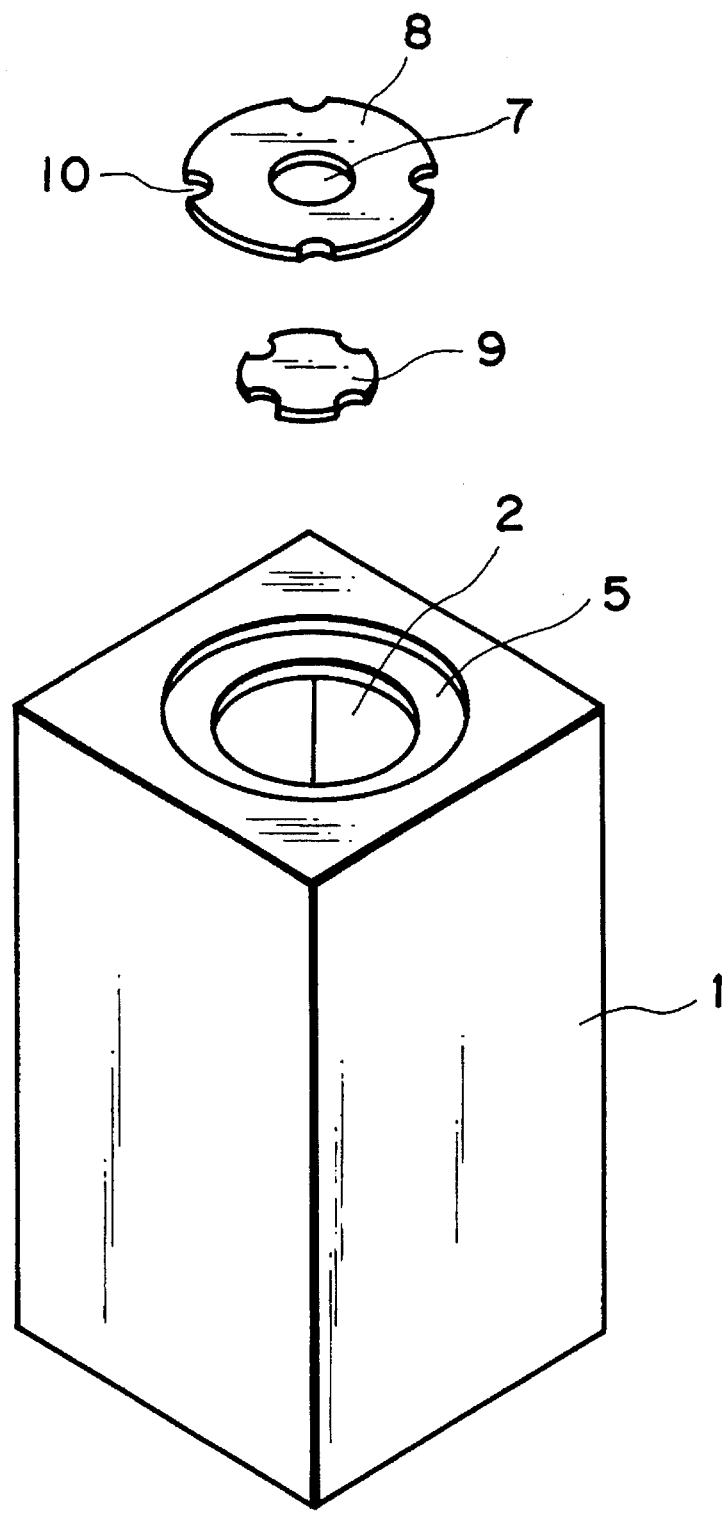
FIG. 19 is an exploded perspective view of a valve mechanism according to a further embodiment of the present invention.

FIG. 19 is an exploded perspective view of a valve mechanism according to a further embodiment of the present invention. Similarly to the foregoing embodiment, the air valve is a bi-directional type. What is different from the foregoing embodiment is that the cut-away portion 10 are not provided in the internal wall of the recess 5 and the internal wall of the opening 2, but four cut-away portion 4 are provided at the circumferential peripheries of the thin films 8 and 9, the cut-away portion 10 being a part of a circle having a diameter of 1 mm.

Also, with this structure, the opening and closing actions of the air valve are not disturbed by silicone oil stagnation. The following has been confirmed. The inside and outside of the valve communicate through the cut-away portions 10. Since the distance between the cut-away portion and an end of the opening is short upon the opening action, the opening threshold pressure is as low as approx. 500 Pa upon pressure reduction. Particularly the initial threshold upon the opening of the valve is lower than the conventional valve. In addition, when the valve closes, the close contact area of the thin film does not reduce very much because of the provision of the cut-away portions, that is, since the sum of the surface tension of the silicone oil does not reduce very much, a reliable closing threshold pressure of approx. 250 Pa can be obtained. Thus, good pressure responsivity is obtained with small difference between the releasing threshold pressure and the closing threshold pressure.

Figure 20:
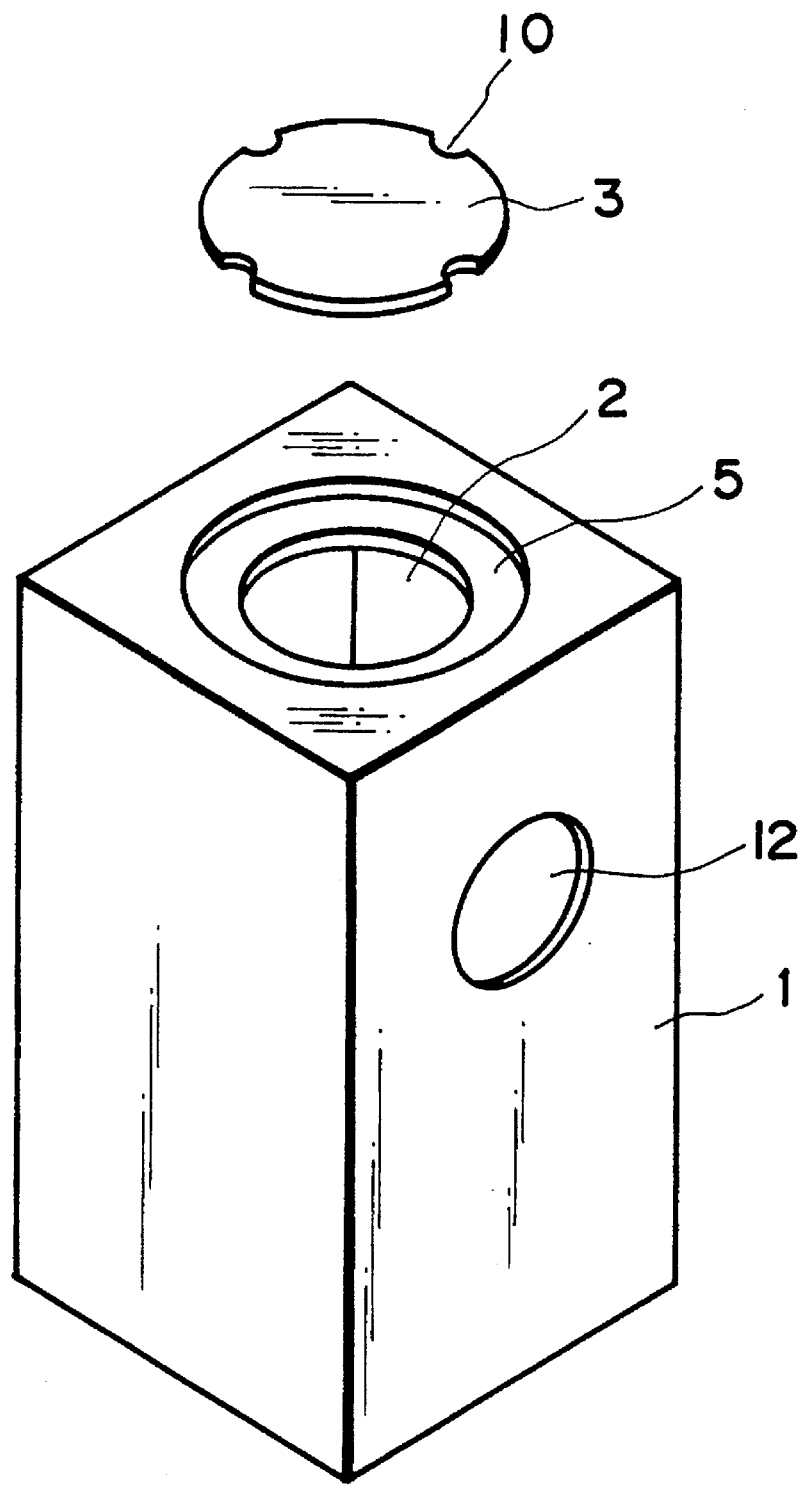
FIG. 20 is an exploded perspective view of a valve mechanism according to an embodiment of the present invention.
Figure 21:
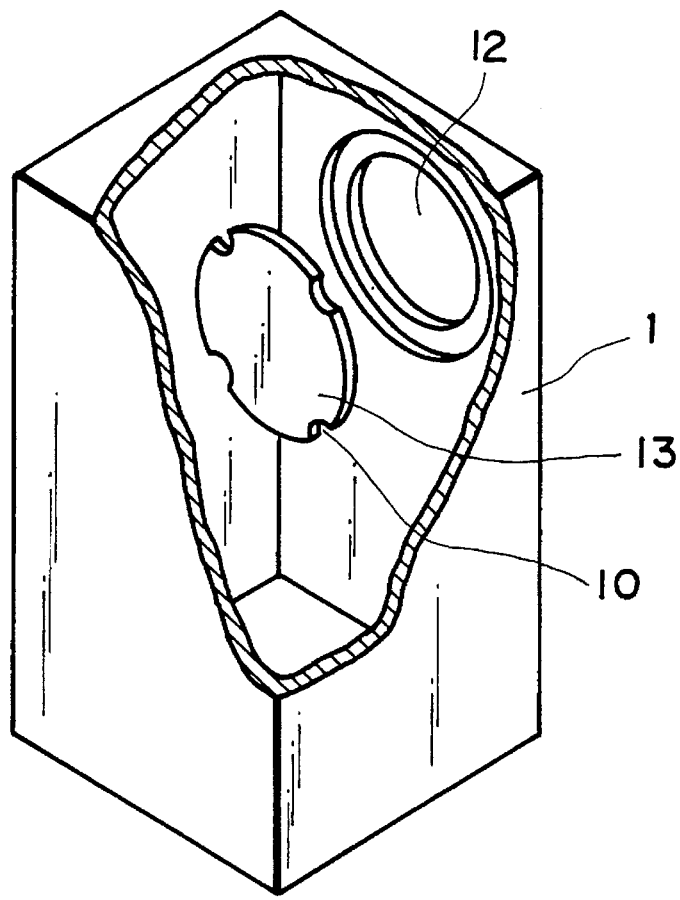
FIG. 21 is an exploded perspective view of a valve mechanism according to an embodiment of the present invention.

Referring to FIG. 20, there is shown a valve mechanism according to a further embodiment of the present invention. FIG. 20 is an exploded perspective view of the valve mechanism of this embodiment, and FIG. 21 is a partly broken perspective view of the valve mechanism of FIG. 20. In this embodiment, a unidirectional valve is provided or pressure reduction is added to a unidirectional valve mechanism for pressure increase, as in the first embodiment of the present invention.

In FIGS. 20 and 21, in the opening 2 having a diameter of 9 mm, a thin film 3 having a thickness of 25 microns and a diameter of 14 mm is closely contacted to the bottom surface of a recess of the container by silicone oil. When the pressure in the container increases, the thin film 3 opens and closes. When the internal pressure reduces, the thin film 3 is urged to the bottom surface of the recess, and therefore, does not operate. The dimension of the thin film 13 covering the opening 12 is the same as that of the thin film 3 for the increasing pressure. The thin film 13 (FIG. 21) is closely contacted to the internal wall of the container by the silicone oil. When the pressure decreases, the thin film 13 opens and closes the valve. When the pressure increases, the thin film 13 is urged to the opening 12, and therefore, does not open.

With this structure, cut-away portions 10, which are a part of a circle having a diameter of 1 mm, are formed in the circumferential periphery of each of the thin film 3 and 13, by which escapes for the silicone oil are provided, thus eliminating obstruction to the opening and closing action of the thin films 3 and 13.

Further improvements will be described. The improvements are applicable to the foregoing embodiments. The general structure of the valve mechanism is the same as any one of the foregoing embodiments, and therefore, the descriptions will be made as to the features of the embodiments.

Figure 22:
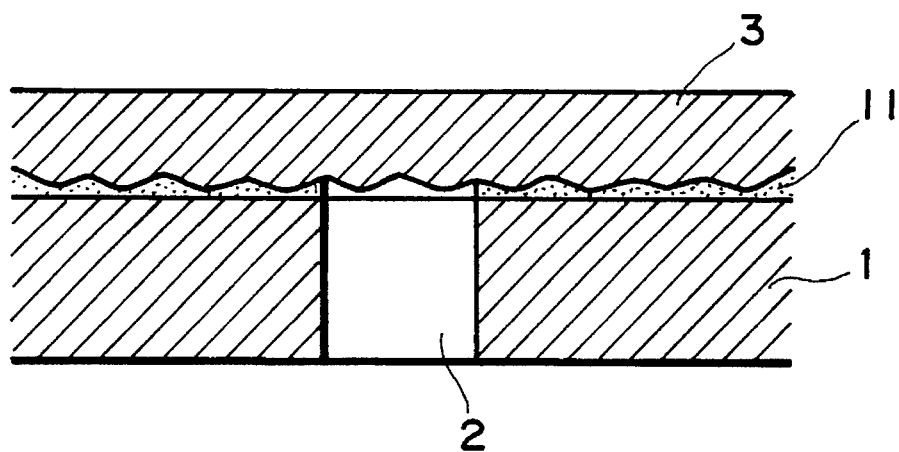
FIG. 22 is a sectional view of a valve mechanism according to an embodiment of the present invention.

FIG. 22 is a sectional view of a part of the valve mechanism of this embodiment, applicable to the valve mechanisms of FIG. 1 or the like. According to this embodiment, the thin film 3 is roughened, as shown in FIG. 22, at the surface contactable to the sealing material 11, so that the surface is roughened to a proper extent. As for the method of the roughening, sandblast treatment or mechanical treatment are available. As a further alternative, the roughness can be provided by the molding of the thin film. Other methods are usable. The supporting portion 1 and the thin film 3 are closely contacted with the sealing material 11 such as silicone oil or the like therebetween. The contacting nature of the sealing material 11 provides the closure when there is substantially no pressure difference, and a predetermined thickness of the coating of the sealing material 11 is assured by the proper roughness of the surface of the thin film.

The sealing material may be the same as described hereinbefore.

In this embodiment, by the proper roughness of the thin film 3, the proper air flow passage may be established in the sealing material even after the valve is left closed for a long period of time, and a very low pressure difference can be finely controlled. In addition, variation in the opening threshold pressure can be minimized. If the degree of the roughness is too high, the sealing material is easily flown out, and the difference between the top and bottom of the roughness is preferably not more than about 20 microns and not less than 1 micron.

The thin film having the structure shown in FIG. 22 is manufactured in the following manner. The material of the thin film 3 was polyethylene terephthalate (PET) film. The thickness thereof was 25 microns, and the diameter thereof was 14 mm (circular). The surface of the thin film 3 contactable to the viscous sealing material was sandblasted, and the difference between the top and bottom of the roughness was 10 microns at maximum and 1 micron at minimum. The material of the thin film 8 was the same.

On the other hand, the diameter of the opening 2 was 8 mm, and the diameter of the opening 7 was 4 mm. The sealing material was silicone oil (TSF-1000, available from Shinetsu Kagaku Kabushiki Kaisha). Using it, the elements are assembled as shown in FIG. 22.

Figure 23:
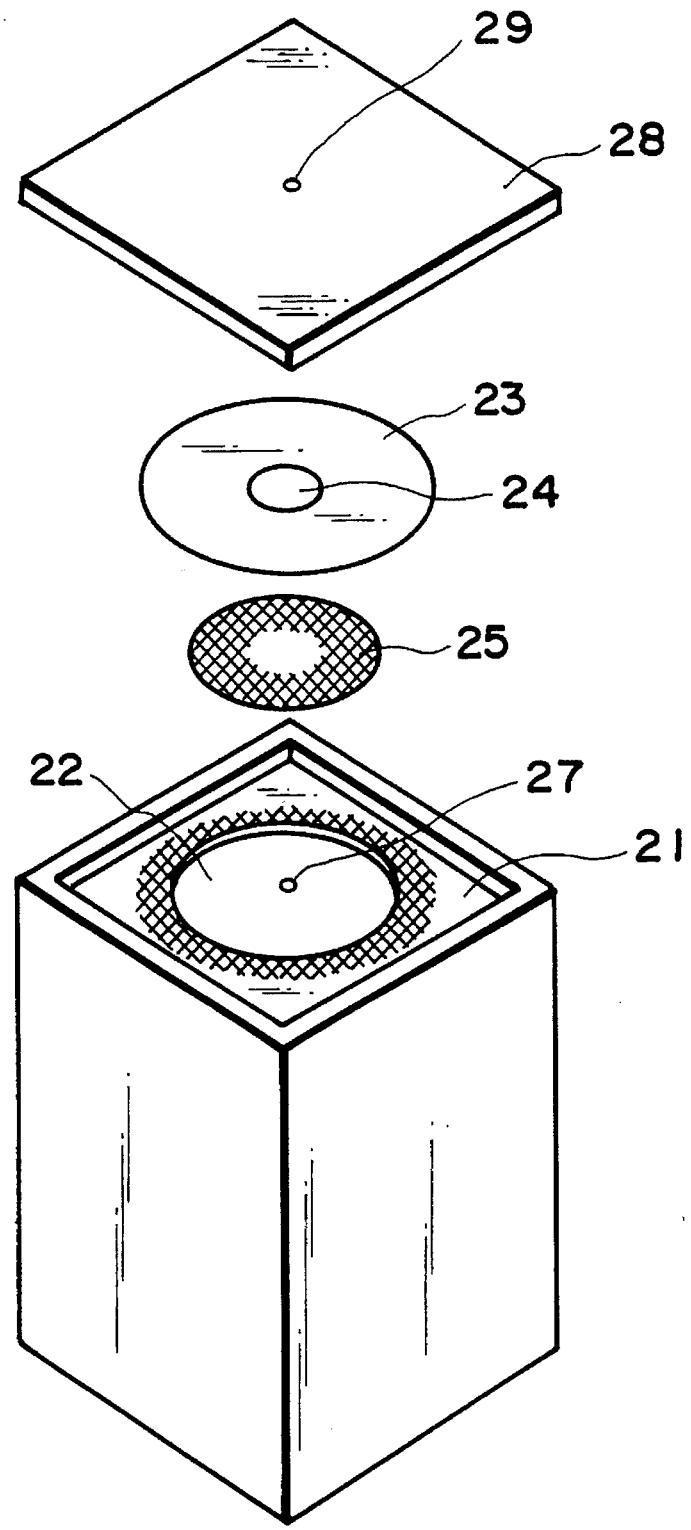
FIG. 23 is an exploded perspective view of a valve mechanism according to an embodiment of the present invention.

Referring to FIG. 23, there is shown a further embodiment in which the valve mechanism of FIG. 4 is modified by the improvement shown in FIG. 22. FIG. 23 is an exploded perspective view of a container according to this embodiment. The surface of the thin film 23 facing to the supporting portion 21 and the thin film 25 is roughened to a proper degree of roughness. The roughening method may be the same as in the foregoing embodiment. The thin film 25 is closely contacted to the thin film 23 to cover the opening 24 thereof. It is smaller than the diameter of the opening of the supporting portion 21, and has such a dimension as to be accommodated in the pressure chamber 22. In this embodiment, the size of the opening 27 is reduced as compared with the case of FIG. 4, and the operating pressure is roughly determined by the provision of a pressure chamber 22. The supporting portion 21, the thin film 23 and the thin film 25 are closely contacted by sealing material such as silicone oil or the like therebetween. A proper quantity of the sealing material is applied to the hatched region in FIG. 23, and close contact force is produced with the corresponding surface portion of the thin film 23 in FIG. 23, so that the valve closed state is provided when there is substantially no pressure difference, and the predetermined thickness of the layer of the sealing material is assured by the proper roughness of the surface of the thin film. The sealing material is the same as in the foregoing embodiment.

Because of the proper roughness of the thin film in this embodiment, the air flow passage can be quickly established in the sealing material, and therefore, the valve is operable with low pressure.

In addition, since the clearance is assured by the provision of the roughness in the contact surface between the thin film 23 and the sealing material, a further lower releasing threshold pressure, and simultaneously, variation of the releasing pressure for the individual releasing actions, can be suppressed, thus stabilizing the operation.

The container having the structure shown in FIG. 23 was manufactured in the following manner. The container is of polypropylene material. The side of the container having the valve mechanism has dimensions of 20 mm×20 mm and a length thereof in a direction perpendicular to the side is 40 mm, and the thickness of all of the wall portions is 1 mm. The side having the valve mechanism has an opening 2 having a diameter of 9 mm. The thin film 23 has a thickness of 25 microns and a diameter of 14 mm, and has a central concentric opening having a diameter of 4 mm. It is made of polyethylene terephthalate (PET) film. The surface thereof contacting with the sealing material is sand-blasted, and the maximum distance between the top and bottom of the roughness is 10-1 microns. The thin film 25 is of the same material and has a diameter of 8 mm. They are assembled as shown in FIG. 23 using silicone oil (TSF-3000, available from Shinetsu Kagaku Kabushiki Kaisha, Japan).

The container is connected with a pump, and a pressure sensor is placed therein. The pressure change was measured while sucking and injecting the air. As a result, when the air was injected, the valve opened when the internal pressure became approx. 250 Pa higher than the external pressure, and it closed quickly. When the injection was continued, the opening and closing actions were repeated. When the air is sucked out of the container, it opened when the internal pressure became approx. 500 Pa lower than the external pressure, and it quickly closed. When the sucking operation was continued, the actions were repeated. The same measurements were carried out after the valve was left for a long period of time. When the air was injected, it opened when the internal pressure became approx. 300 Pa higher than the external pressure, and it closed quickly. When the injection was continued, the actions were repeated. When the air was sucked out, it opened when the internal pressure became approx. 600 Pa lower than the external pressure, and it quickly closed. When the sucking operation was continued, the opening and closing actions were repeated. Thus, the stabilized operation of the valve mechanism of this embodiment has been confirmed.

As a comparison, the results of experiments of a container using thin films without the clearance maintaining means of this invention are shown. As regards the injection of the air, when the internal pressure became approx. 300 Pa higher than the external pressure, it opened and it closed quickly. As regards the sucking of the air, it opened when the internal pressure became approx. 600 Pa lower than the external pressure, and it quickly closed. After it is left for a long period of time, the same tests were carried out. When the air was injected, it opened when the internal pressure became approx. 600 Pa higher than the external pressure, and it quickly closed. When the air was sucked, it opened when the internal pressure became approx. 1000 Pa lower than the external pressure, and it quickly closed. Without the clearance maintaining means, the releasing threshold pressure of the air valve increases after it is left on the shelf for a long period of time. In FIG. 23, an outlet port is properly provided as in the foregoing embodiment.

Figure 24:
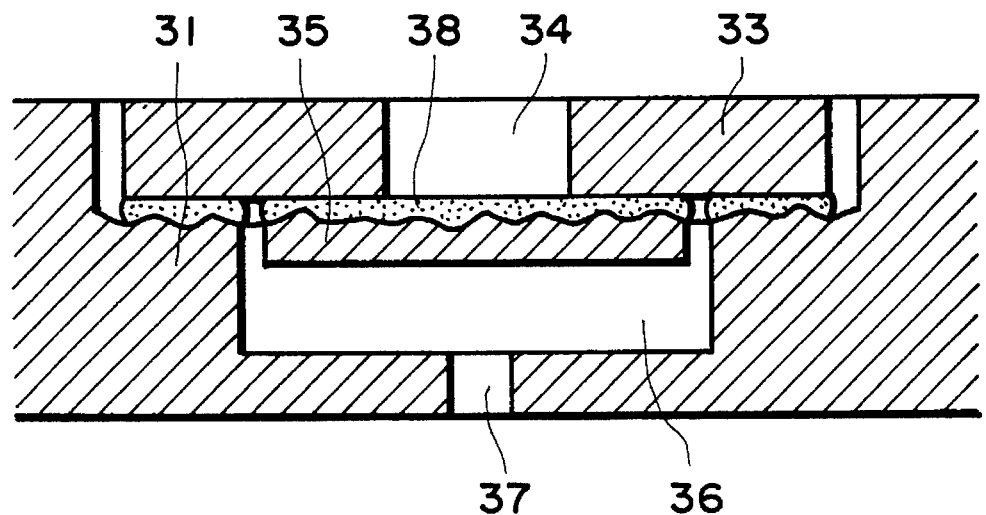
FIG. 24 is a sectional view of a valve mechanism according to an embodiment of the present invention.

FIG. 24 is an enlarged view of a valve according to a further embodiment. As shown in FIG. 24, the clearance maintaining means is provided by roughening such a surface of the supporting portion 31 as is contactable with the sealing material and by roughening such a surface of the thin film 35 as is contactable to the sealing material. When the pressure difference between the internal and external pressures is lower than the releasing threshold pressure, the valve is closed by the sealing material 38 between the thin film 33 and the thin film 35 and the supporting portion 31. Because of the proper roughness of the thin film 35 and the supporting portion 31, the predetermined thickness of the silicone oil layer is assured. When a pressure difference is produced between the inside and outside of the container, the air flow passage is quickly formed in the sealing material 38 because of the roughness of the thin film 35 and the roughness of the supporting portion 31. When the pressure difference reduces due to the opening, the air flow passage is quickly closed by the elasticity of the thin film and the surface tension of the sealing material 38.

In this embodiment, the distance between the top and bottom of the roughness is 10 microns at the maximum and 1 micron at the minimum both for the supporting portion 31 and the thin film 35. The method for producing the roughness may be the same as in the foregoing embodiment.

Figure 25:
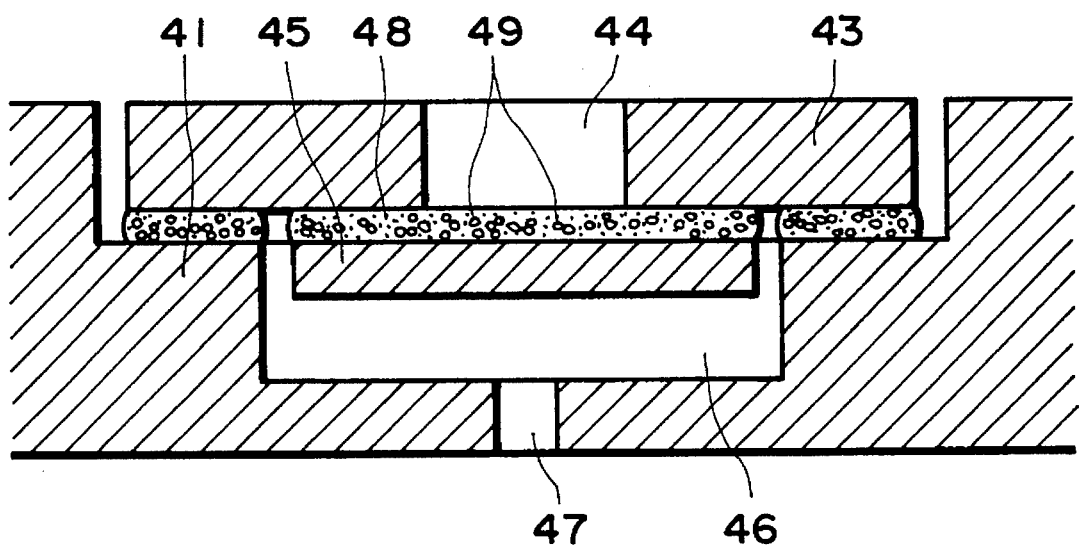
FIG. 25 is a sectional view of a valve mechanism according to an embodiment of the present invention.

Referring to FIG. 25, a further embodiment of the present invention will be described. As shown in this FIG., a thin film 43, a supporting portion 41 and a thin film 45 are closely contacted with the silicone oil 48 therebetween. The silicone oil 48 contains particles 49 as clearance maintaining means (spacer). When a pressure difference is produced between the inside and outside of the container, air flow passage is quickly formed in the sealing material. By the formation of the passage, the pressure difference reduces, and then, the passage is quickly closed by the elasticity of the thin films and the surface tension of the sealing material.

The particles 49 are preferably of a material not influenced by the sealing material such as silicone oil. The material may be metal or resin. The particle sizes are preferably uniform, since otherwise smaller particles move the clearance defined by large particles with the result of the small particles are concentrated at a limited area, so that the intended function is deteriorated. Empirically, the particle size is preferably 5–20 microns, approximately.

Further improvement will be described. When the valve mechanisms according to the foregoing embodiments are used, it is preferable to use a protection member for covering the thin films to prevent introduction of external foreign matters or unintended access to the thin film.

Figure 26:
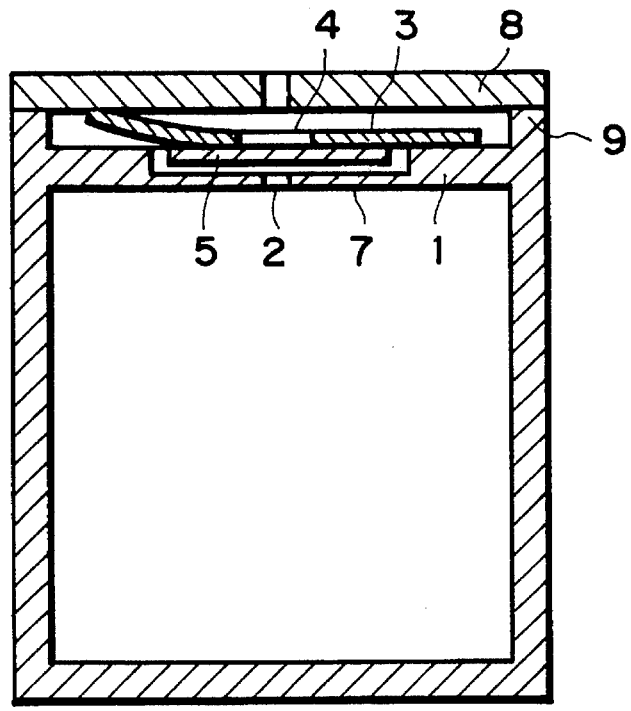
FIG. 26 is a sectional view of a valve mechanism according to an embodiment of the present invention.

However, the inventors investigations and experiments have revealed that, as shown in FIG. 26, particularly under the high temperature and high humidity condition, the raised valve may be contacted to the corresponding surface of the protection member due to condensed water. Since the bending stress of the valve itself is small, the contact between the protection member and the valve may be stronger by the resilient restoring force after the pressure has been released. If this occurs, the valve is kept opened.

Figure 27:
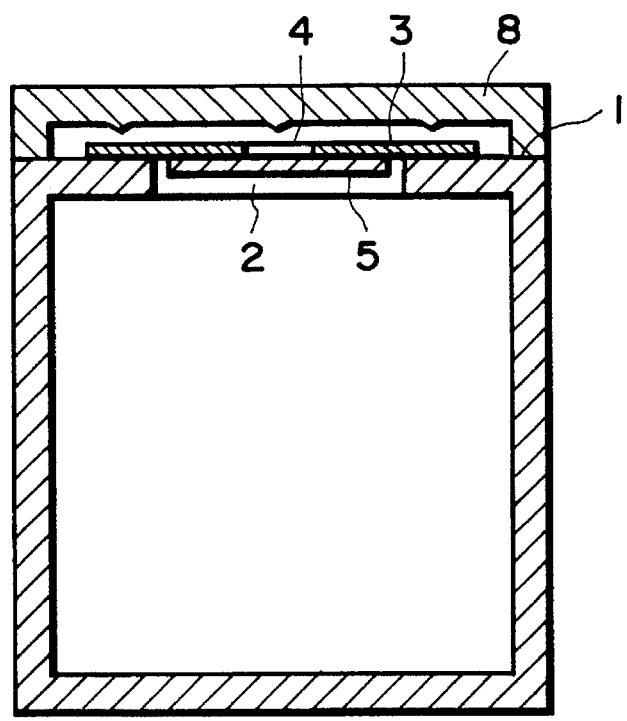
FIG. 27 is a sectional view of a valve mechanism according to an embodiment of the present invention.
Figure 28:
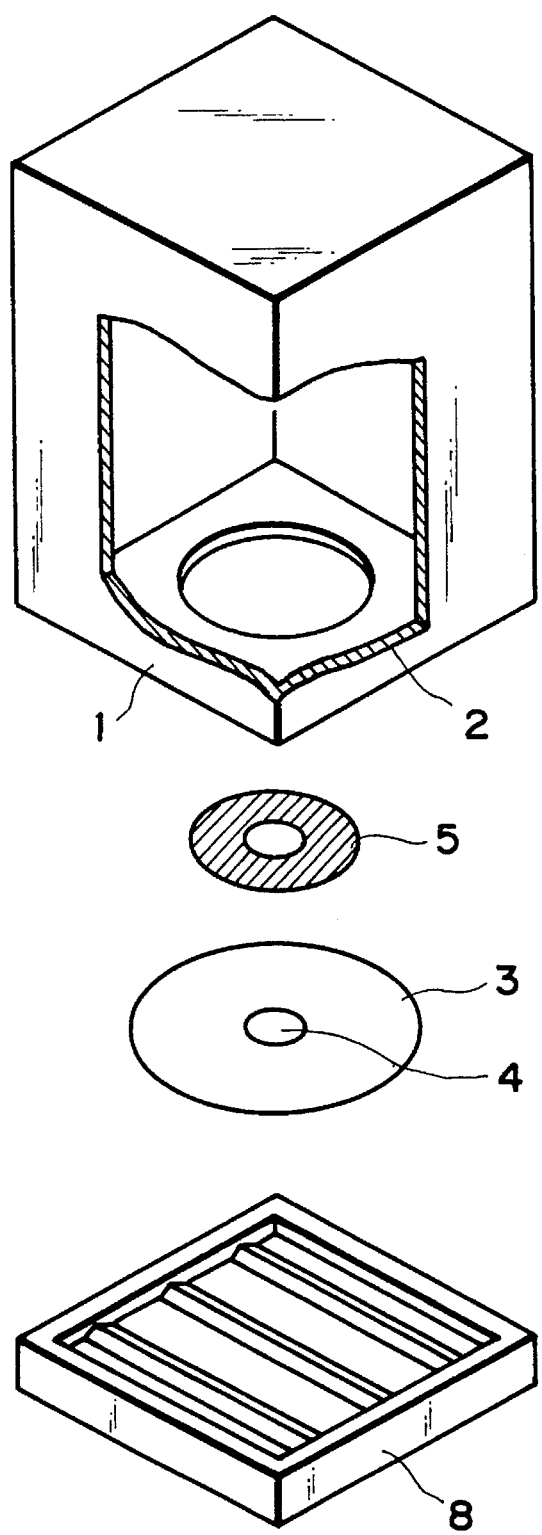
FIG. 28 is an exploded perspective view of a valve mechanism according to an embodiment of the present invention.
Figure 29:
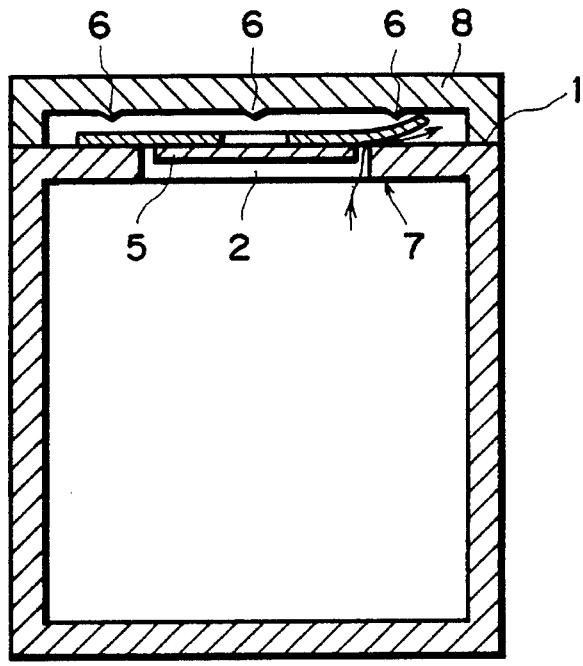
FIG. 29 is a sectional view of a valve mechanism according to an embodiment of the present invention.

In the following embodiments, the general structure of the valve mechanism and the operation thereof are the same as in the foregoing embodiments, and therefore, the description will be limited to the different portions in the following descriptions. FIG. 27 is a sectional view of a container having a valve according to a further embodiment of the present invention. FIG. 28 is an exploded perspective view thereof. In the Figure, an outlet for dispensing the content of the container is not shown, but may be provided at proper positions. A protection member 8 of this embodiment is disposed at such a position as not to obstruct the action of the thin film 4 and the action of the thin film 5. The portions corresponding to the thin films are formed into projections, as shown in the Figure. As shown in FIG. 29, the thin film may be contacted to the protection member when the valve operates. However, according to this embodiment, the concentric circular projections 6 are provided on the surface of the protection member 3 corresponding to the thin film 3, and therefore, even if the thin film 3 is going to closely contact to the protection member 8, the projections 6 prevent it. The preferable positions of the projections 6 of the protection member are outside a next end for the release to the ambience and inside positions where the thin film is contactable to the protection member.

Figure 30A:
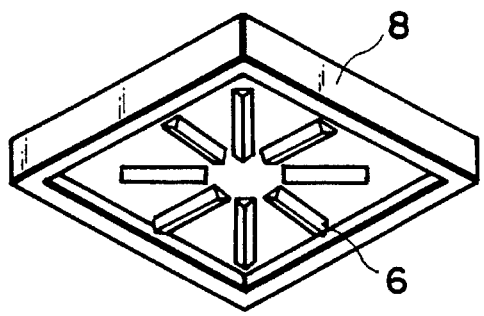
FIGS. 30A, 30B and 30C are perspective views of various protection members.
Figure 30B:
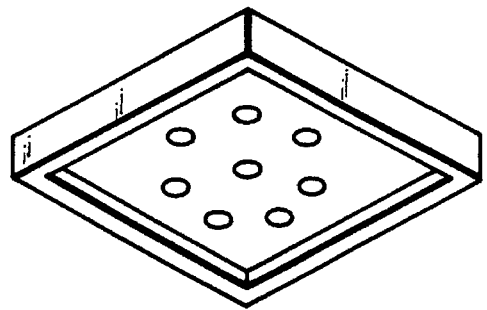
Figure 30C:
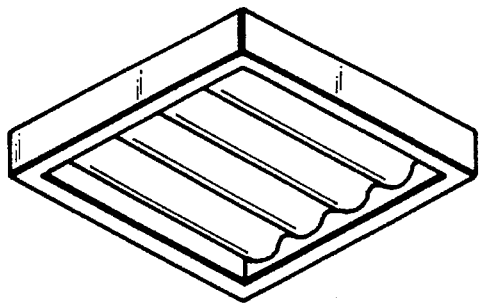

FIGS. 30A, 30B and 30C show different configurations of the projections 6 faced to the thin film. In FIG. 30A, the projections are radially formed, with which the sticking of the thin film to the protection member can be avoided irrespective of the way of rising of the thin film. In FIG. 30B, the projections are semi-spherical. In FIG. 30C, the inside wall of the protection member is waved. The projections 6 are provided by the wave. Here, an opening for permitting air passage is omitted, but may be provided at proper position. Now, a liquid container capable of supplying liquid therein with stabilized pressure by using the valve mechanism of this invention will be described.

The present invention is not limited to the recording, but is applicable to any liquid container, but the description will be made as to the ink container for recording.

Figure 31:
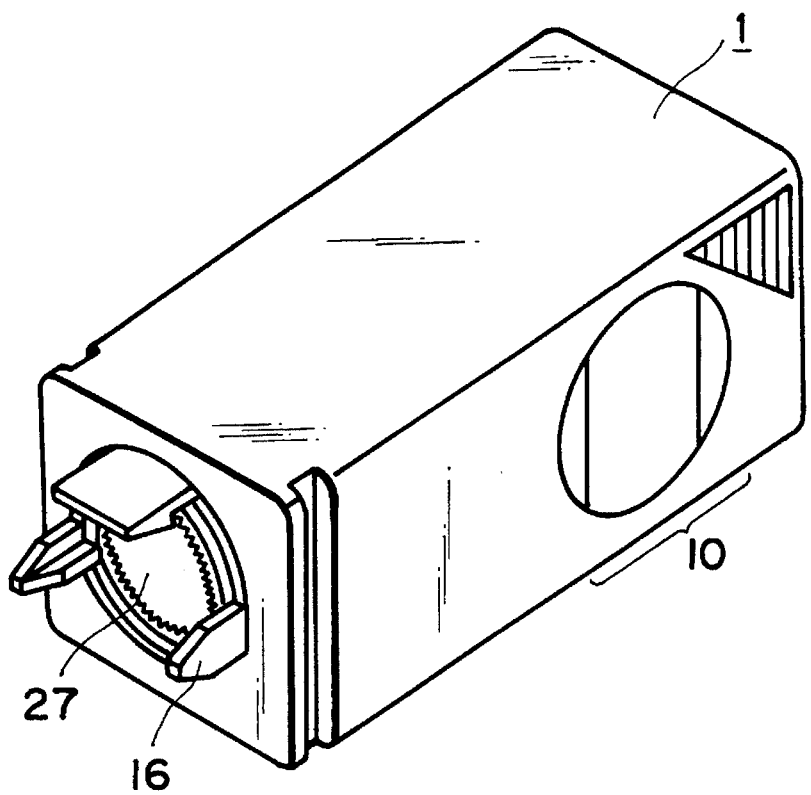
FIG. 31 is a perspective view of a liquid container using a valve mechanism according to an embodiment of the present invention.

FIG. 31 is a perspective view of a liquid container according to an embodiment of the present invention. An ink container 1 functioning as a second container is provided with a valve 10 for adjusting the pressure in the ink container. In FIG. 31, only one valve is shown, but the number thereof may be plural depending on the desired adjustment of the pressure in the container. The container is connected with a recording head which is to be supplied to the ink in the container, by three connecting pawls 16.

Through an ink supply port 27, the ink is supplied to the recording head.

Figure 32:
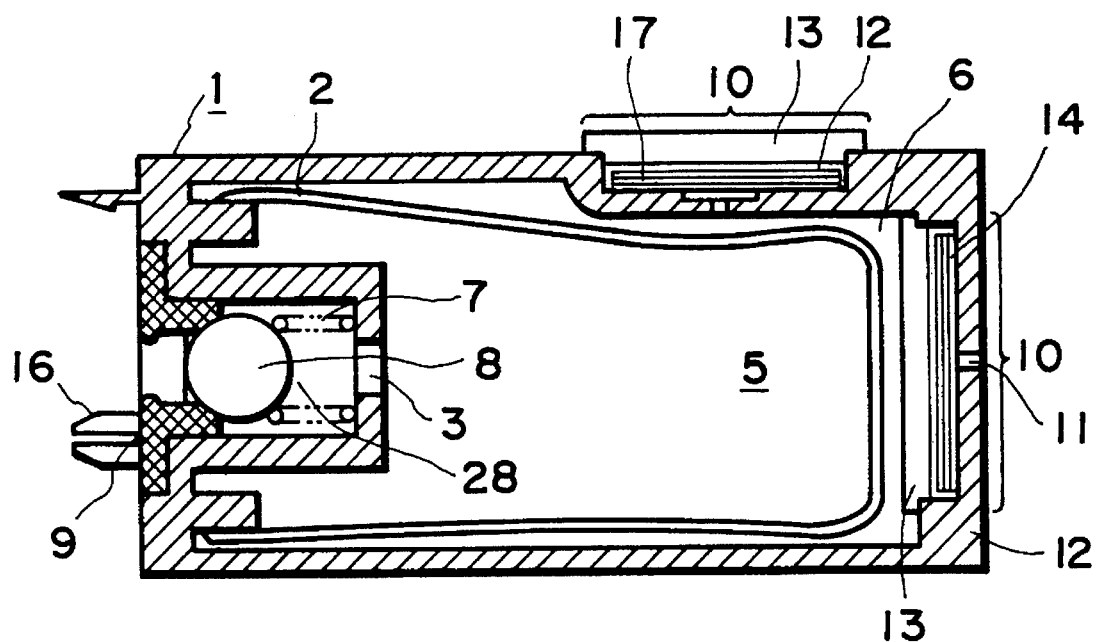
FIG. 32 is a sectional view of a liquid container using a valve mechanism according to an embodiment of the present invention.

FIG. 32 is a sectional view of the ink container of FIG. 31, which is provided with a valve mechanism for controlling air flow between the inside of the container and the outside thereof. In this Figure, two valves 10 as shown in FIG. 1 are used. As shown in the Figure, the ink container 1 is sealed when the inside and outside pressures of the ink container are balanced.

In the ink container 1, there is an ink bladder 2 (first container) for directly containing liquid ink. An ink supply port 3 is formed in the ink bladder 2 to supply the ink 5 from the inside thereof to the recording head. The port 3 penetrates through a part of the wall of the ink container 2.

The ink bladder is of sufficiently flexible material, and therefore, the capacity of the ink in the container can be made equal to the volume of the ink container. Therefore, the ratio of the accommodated ink to the volume of the ink container can be increased significantly as compared with the case in which the ink is accommodated in porous material contained in the ink container. Therefore, the device having the ink container can be reduced in the size thereof.

The inside of the ink bladder 2 and the space between the ink bladder (second container) and the ink container ( first container) are completely separated. Thus, the double structure is established by the ink container (second container) provided with the valve mechanism and the ink bladder (first container) for directly retaining the ink. The pressure of the gas in the space 6 therebetween can be adjusted, so that the ink can be supplied to the ink receiving side without the possibility of the ink leakage to the outside. When the recording head receiving the ink and the ink container are not connected, the communication between the ink bladder inside and the recording head is stopped by a rubber plug 9 and a ball urged to the direction of closing the passage 28 by resilient member such as confining spring 7 or the like.

In the valve mechanism in this embodiment, two valves are used to adjust the pressure in the space 6 relative to the external pressure. The upper valve is a one-way valve capable of permitting gas flow from the space 6 to the outside of the ink container, and the right valve is for permitting gas flow into the space 6. In this embodiment, the one-way or unidirectional valve as shown in FIG. 1 is used, but it may be a valve of another embodiment.

Figure 33:
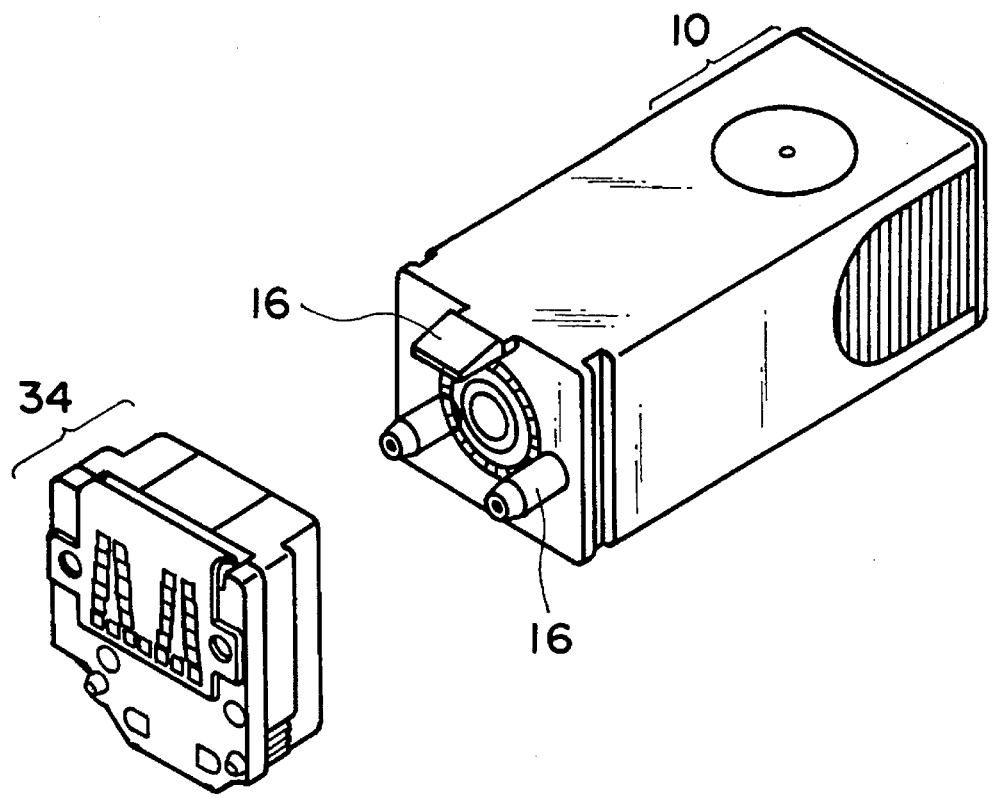
FIG. 33 is an exploded perspective view of a recording head cartridge according to an embodiment of the present invention.
Figure 34:
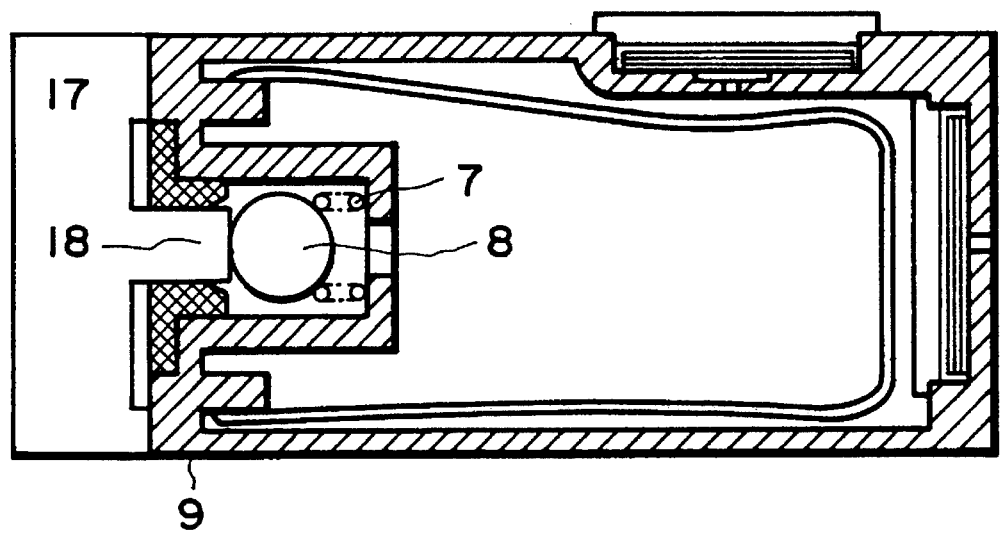
FIG. 34 is a sectional view of a recording head cartridge according to an embodiment of the present invention.

FIGS. 33 and 34 show an example of a recording head unit in which the liquid container is connected with the recording head 34 or 17. When it is connected with a recording element, a pipe 18 projected from the recording element pushes the ball 8 of the container toward the ink container against the spring force of the spring 7, thus separating the ball from the rubber plug 9 of the communication passage 28, by which the ink can be supplied from the ink bladder to the recording head 34 or 17.

The operation of the liquid container of this embodiment will be described. When the pressure Pin in the container is substantially equal to the pressure Pout outside the container, and when the container is not connected with the recording head, or the recording apparatus of an ink jet recording apparatus connected with the container is not operated, and therefore, the ink is not consumed, the thin films of the two valves 31 and 32 are closely contacted to the sealing material applied surface 15 which is a part of the ink container, with the sealing material therebetween, provided that the ambient condition (temperature, pressure or the like) does not change. Therefore, the inside and outside of the container are completely separated.

Figure 35A:
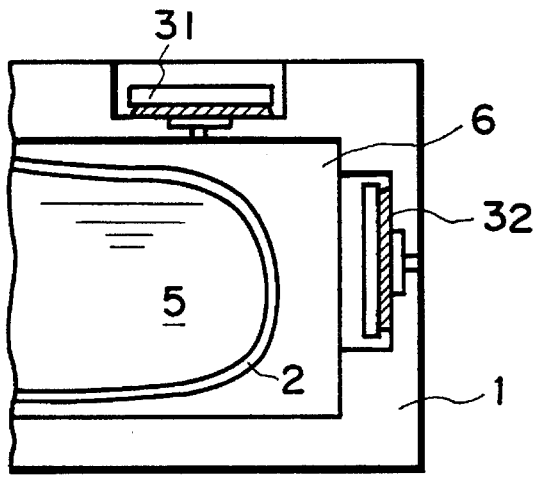
FIGS. 35A, 35B and 35C illustrate operation of the recording head cartridge according to the embodiment of the present invention.

When the pressure in the space 6 is lower than the external pressure, for example, as when the recording operation is carried out so that the ink is discharged through the supply port with the result of the reduction of the volume of the bladder (during the recording operation, the proper negative pressure at the nozzle position of normal ink jet recording head is 0—150 mmAq), the ink ejection would not be in good order if the negative pressure is too large. In an extreme case, the ink would not be ejected. Even if the negative vacuum is 0, the vacuum is quickly increased by the small consumption of the ink. The vacuum in the space 6 increases with consumption of the ink. However, as long as the vacuum is not influential to the recording operation, the valves 31 and 32 are maintained closed as shown in FIG. 35A by the settings of the operating pressures.

Figure 35B:
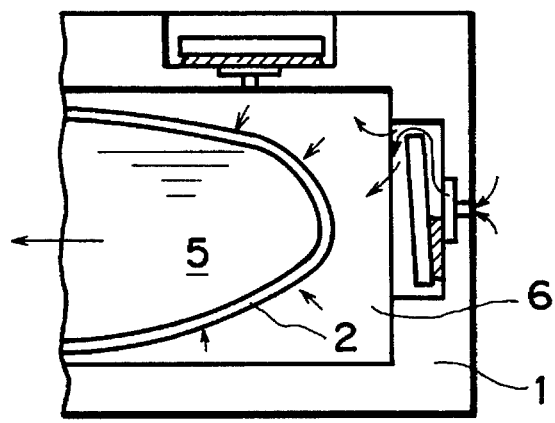

With the consumption of the ink, the vacuum further increases. The vacuum is preferably not too high in the space 6. Therefore, when the pressure difference becomes higher than a predetermined pressure difference $\delta P1$ ($\delta P1 < Pout-Pin$), that is, when the force applied to the thin film (Mylar sheet) of the valve 32 by the pressure difference Pout–Pin, exceeds a valve operating pressure $\delta P1$ determined by the close contact force between the thin film and the container surface by the sealing liquid and the force tending to deform the thin film, a part of the thin film deforms so that the thin film is separated from the sealing material applied surface 15, and the external air is introduced into the ink container through the clearance (FIG. 35B). As a result, the vacuum in the space 6 is eased, and therefore, the vacuum in the ink bladder is eased, so that the pressure of the ink is properly controlled. When the vacuum is reduced, the deformed thin film restores the original position, so that the communication between the space 6 and the outside of the container is separated again. The operating pressure of the valve 32 is preferably selected so as to provide the pressure at the nozzle of the recording head, 0—150 mmAq. On the other hand, in order to provide the proper pressure at the nozzle position, the internal pressure of the container is different depending on the level of the position of the liquid container and the level of the position of the nozzle supplied with the ink. However, the selection may be made such that a sum of the pressure difference due to the level difference and the pressure of the liquid in the container is within the above range.

When Pin>Pout, on the other hand, for example, when the external temperature increases without consumption of the ink, gas in the space 6 expands by the heat with the result that the pressure Pin becomes higher than the pressure Pout. However, when the pressure difference Pin>Pout between the space 6 and the outside of the container increases beyond the operating pressure $\delta P2$ of the valve 31, the valve 31 opens to permit communication between the space 6 and the outside, by which the expanded portion of the gas is discharged to the outside. Thus, the pressure Pin, that is, the pressure in the ink bladder is eased. Therefore, the ink liquid is not leaked in the part supplied with the ink, such as the ink jet recording head.

The operating pressure difference $\delta P2 = Pin - Pout$ is desirably as close as possible to 0. However, the pressure difference is satisfactory if it is within the range not permitting the ink to leak at the recording head. The pressure is different depending on the nature of the ink and the state of the nozzle of the recording head, but it is generally not more than 150 mmAq at the nozzle position.

When the ambient pressure around the ink container changes as in the case that it is transported in an air plane, the similar operation is carried out so that the pressure is adjusted in response to the pressure change, so that the ink leakage due to the pressure change can be prevented.

Figure 35C:
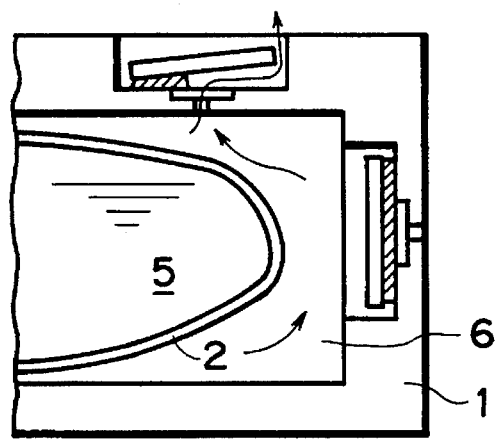

When the external pressure lowers to a degree beyond the tolerable pressure of the space 6, the action shown in FIG. 35C occurs. On the contrary, if the pressure of the space 6 exceeds beyond the tolerable range, the action shown in FIG. 35B occurs. The structure and the operating pressures of the valves 32 and 31 are adjusted in accordance with the specifications of the recording device. However, the adjustment is relatively easy in the embodiments of the valve mechanisms, as described hereinbefore.

Figure 36:
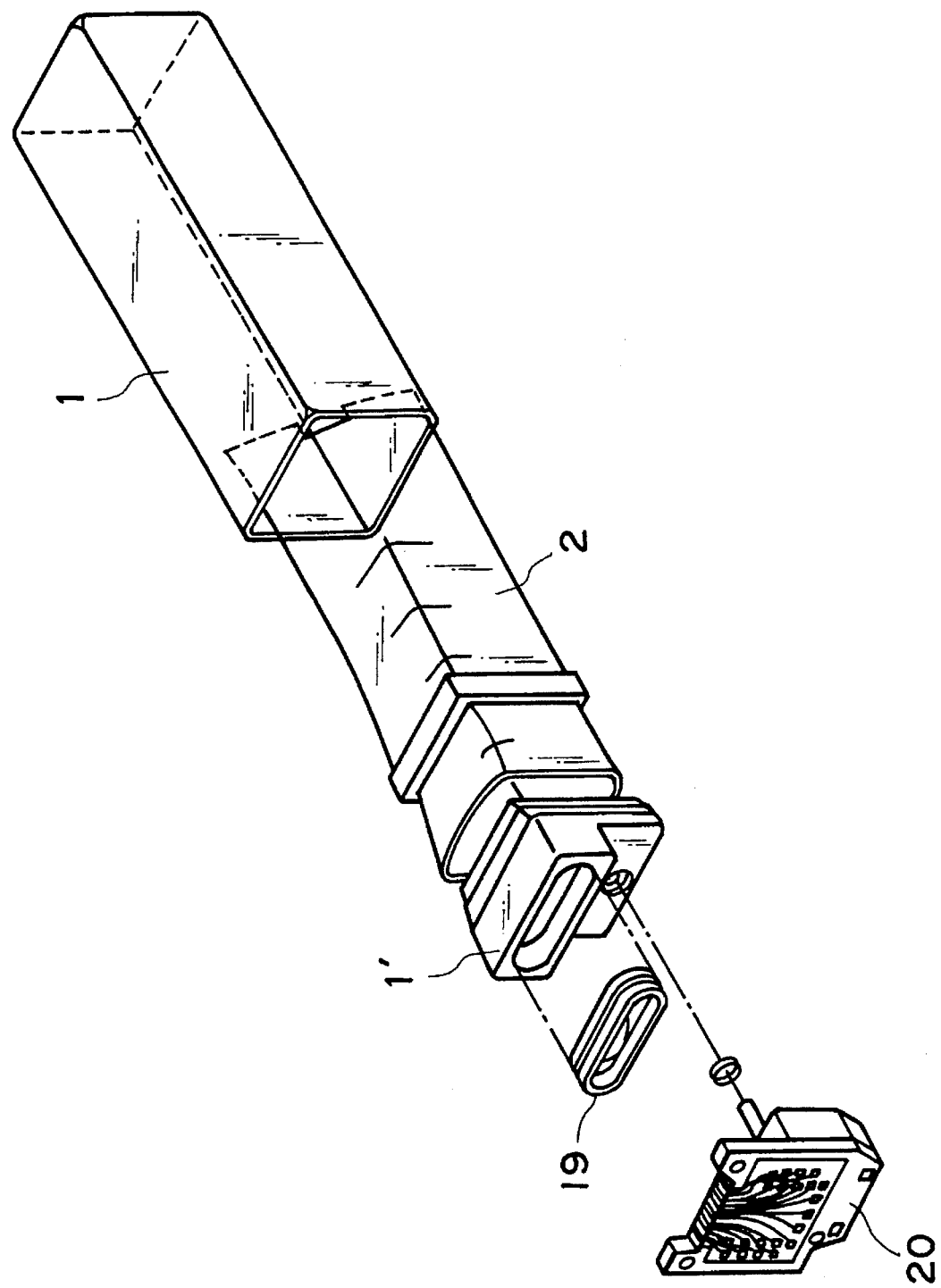
FIG. 36 is an exploded perspective view of a recording head cartridge according to an embodiment of the present invention.

FIG. 36 is a liquid container having a valve mechanism unit shown in FIG. 3. In this embodiment, the valve unit 19 is retained in a unit holder 1' which is a part of the ink container 1. By the respective valves in the valve unit, the pressure in the space between the ink container 1 and the ink bladder 2 is adjusted in the manner described in the foregoing embodiment. By the use of the valve mechanism unit, a further compact liquid container which is easy to manufacture, can be provided.

Figure 37A:
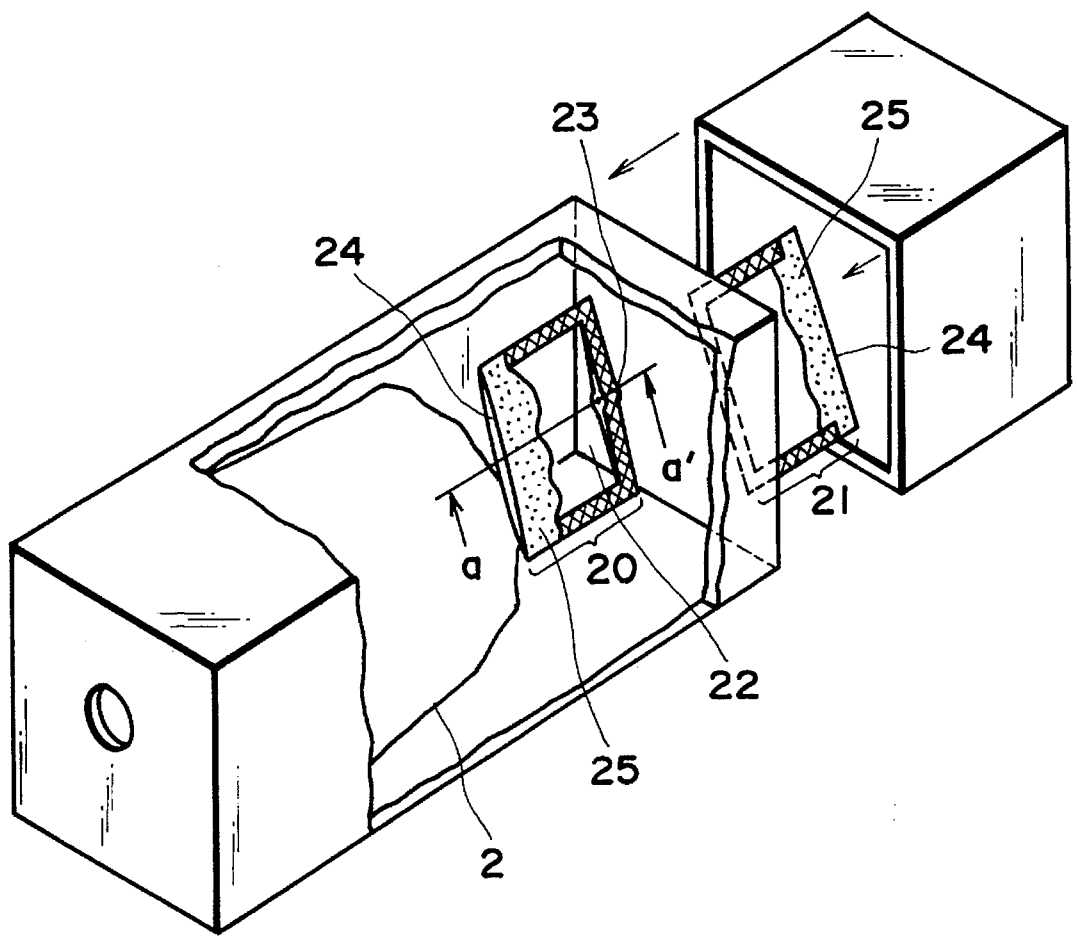
FIG. 37A is an exploded perspective view of a recording head cartridge according to an embodiment of the present invention.
Figure 37B:
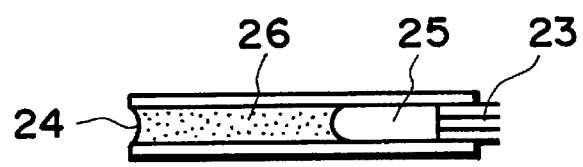
FIG. 37B is a sectional view taken along a line a–a'.

FIG. 37 shows another example of a liquid container using another valve mechanism. In this embodiment, the valve mechanism is in the form of an envelope constituted by a flexible sheet and having an opening at one side (valves 20 and 21). One end portion 22 of the valve communicates with a port 23 of the ink container body, and the opposite end 24 is opened. A non-volatile oil 26 as the sealing material as described in the foregoing embodiment is applied to the inside surface 25 of the envelope, and therefore, the inside surfaces of the envelope are closely contacted. Similarly to the foregoing embodiment, when the pressure difference is not large, the gas does not flow between the outside of the container and the inside thereof.

Similarly to the foregoing embodiment, one of the valves 20 functions to adjust in-flow of the air from the outside, and the other of the valves 21 adjusts the out-flow of the gas from the space between the ink bladder and the ink container to the outside of the ink container. In this embodiment, also, at a predetermined pressure $\delta P3=Pin-Pout$ (valve 21) between the space and the outside of the container or at the pressure difference $\delta P4=Pout-Pin$ (valve 20), the pressure acting to the inside surface 25 of the valves 20 and 21 exceeds the close contact force between the sheets due to the existence of the oil 26, so that the contact between the sheets are released to permit gas flow. As a result, the pressure in the space is similarly controlled.

Figure 38:
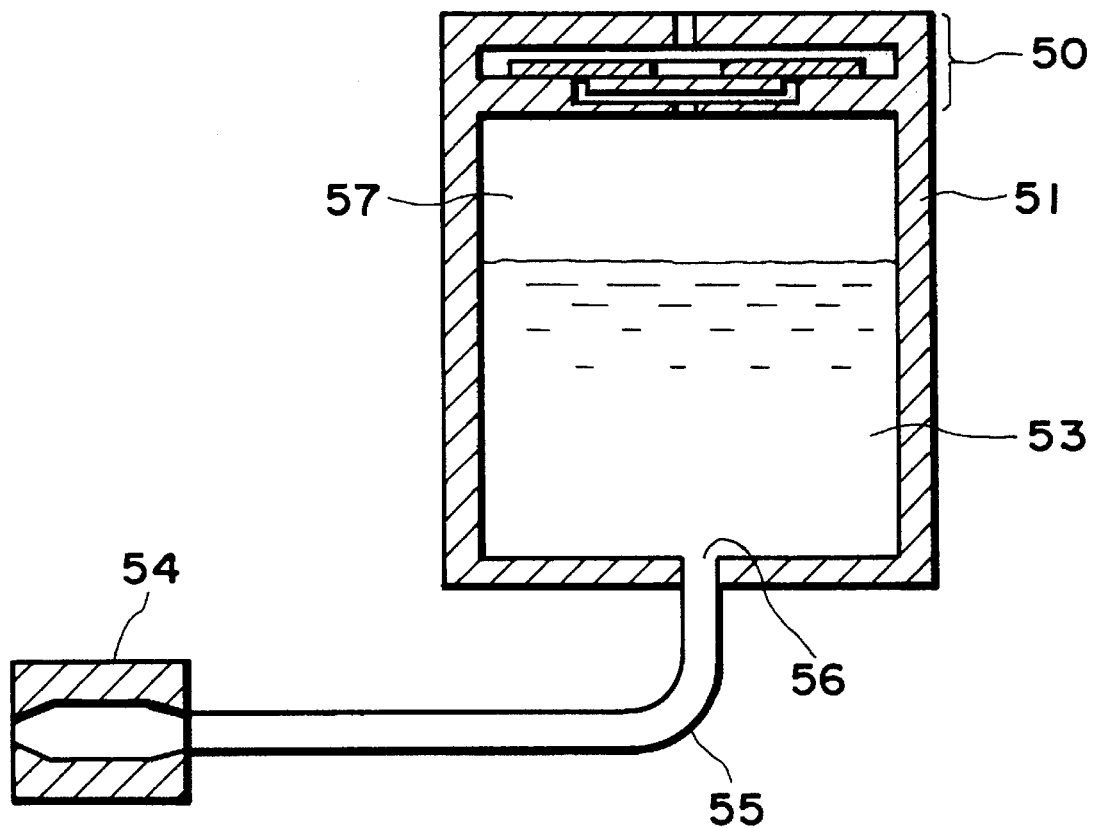
FIG. 38 is a sectional view of a liquid container according to an embodiment of the present invention.

Referring to FIG. 38, a further embodiment will be described, in which the the liquid container having the bi-directional air valve of FIG. 4 is used. The top part of the ink container is provided with the bi-directional air valve. The container contains the ink 53. The ink 53 is supplied to the recording head 54 through the supply port 56 and a supply tube 55 to the recording head 54. The ink is ejected from the recording head 54 by ink ejecting means in accordance with the image signal applied from an unshown signal transmitting means. The recording head 54 is mounted on a carriage of a printer, and the ink container 51 is disposed at a proper position in the printer, which is in a serial printing type.

According to this embodiment, the valve mechanism of this invention is used as the air vent, and therefore, the stable printing is possible without ink leakage irrespective of the position of the ink container.

The quantity of the ink 53 in the ink container 51 is reduced in accordance with the printing operation of the recording head, and the pressure in the ink container 51 gradually decreases. When it decreases to a predetermined level, the valve mechanism operates to prevent the further decrease of the pressure. This function is effective to keep the size of the droplets ejected from the recording head 54 within a predetermined preferable range.

In addition, when the ink container 51 placed in a high temperature condition or in a low pressure condition, the air in the ink container 51 is easily released to the outside through the bi-directional air valve 50, thus preventing the ink 53 from leaking out of the recording head.

Furthermore, since the bi-directional air valve 50 is usually closed, the evaporation of the ink from the container can be prevented. The valve can be easily opened even after it is left on the shelf for a relatively long period, because of the provision of the clearance maintaining means.

When the improvement of the foregoing embodiment in the reduction of the operating pressure, the opening of the air valve is effected quickly, and the pressure of the inside of the container reduces too much with the result of the improper printing or ink ejection failure, or it increases too much with the result of the ink leakage.

Figure 39:
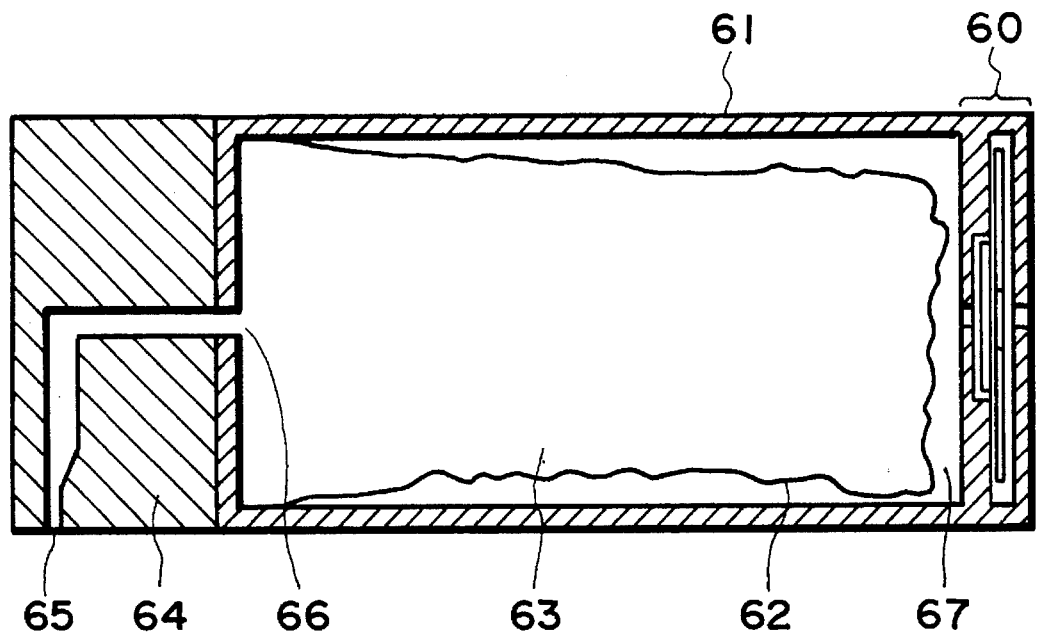
FIG. 39 is a sectional view of a recording head cartridge according to an embodiment of the present invention.

FIG. 39 shows another embodiment of the ink container portion of a recording head unit of the ink jet printer, wherein the bi-directional air valve of FIG. 4 is used.

At an end of the ink container 61, there is provided a bi-directional air valve 60, and an ink bladder 62 for containing the ink 63 is contained in the container. The ink 63 in the ink bladder 62 is supplied to the recording head 63 through the supply port 66 of the ink container 61. The ink is ejected through ejection outlets 65 by unshown ejection means in accordance with the image signal supplied from unshown signal transmitting means. The ink container and the recording head is mounted on a carriage, and the printing operation is effected serially.

With the printing operation, the quantity of the ink 63 in the bladder 62 decreases, and the pressure in the ink container 61 reduces. When the pressure decreases to a predetermined level, the bi-directional air valve 60 opens, thus preventing further reduction of the pressure. This function is effective to keep the size of the droplets ejected from the ejection outlets 65 within a predetermined preferable range.

When the container is placed with the ejection outlets at the bottom, the ink at the ejection outlets is under the static head corresponding to the height of the ink. Usually, however, the ink does not leak by the function of the meniscus at the ejection outlets. If the surface having the ejection outlets is wet, and therefore, the meniscus does not function properly, the ink leaks from the bladder through the ejection outlets. Since, however, in this embodiment, the bi-directional air valve 60 is provided, and the releasing threshold pressure at the time of pressure reduction is higher than the static head, the liability of the ink leakage is removed.

In addition, when the ink container 61 is placed in a high temperature condition or in a low pressure condition, the air in the ink container 61 is easily released to the outside through the bi-directional air valve 60, thus preventing the ink from leaking out of the ejection outlets.

When the improvement of the foregoing embodiment in the reduction of the operating pressure, the opening of the air valve is effected quickly, and the pressure of the inside of the container reduces too much with the result of the improper printing or ink ejection failure, or it increases too much with the result of the ink leakage.

Figure 40:
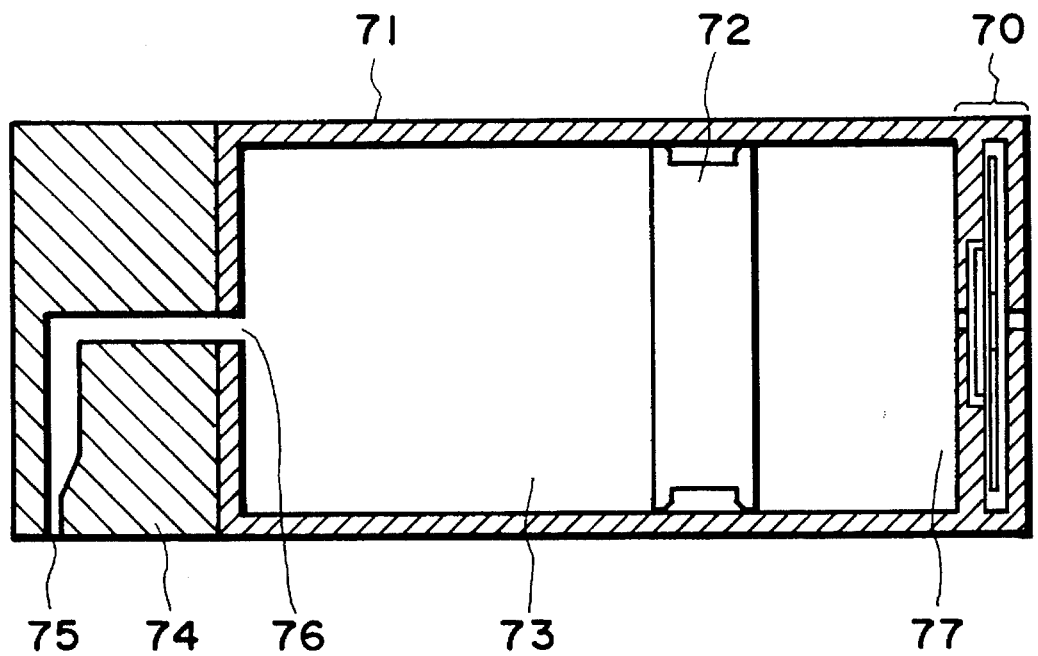
FIG. 40 is a sectional view of a recording head cartridge according to an embodiment of the present invention.

FIG. 40 shows an ink container according to a further embodiment of the present invention, in which the ink 73 is separated from the air not by a bladder but a movable wall 72, with the consumption of the ink by the recording head, the movable wall 72 moves.

Also in this ink container, similarly to the foregoing embodiment, the ink ejection is stable, and the ink does not continuously leak even if the ejection outlet is wetted. On the other hand, even when the temperature increases, the air in the container 71 is smoothly released to the outside of the container, and therefore, the ink does not leak out.

Figure 41:
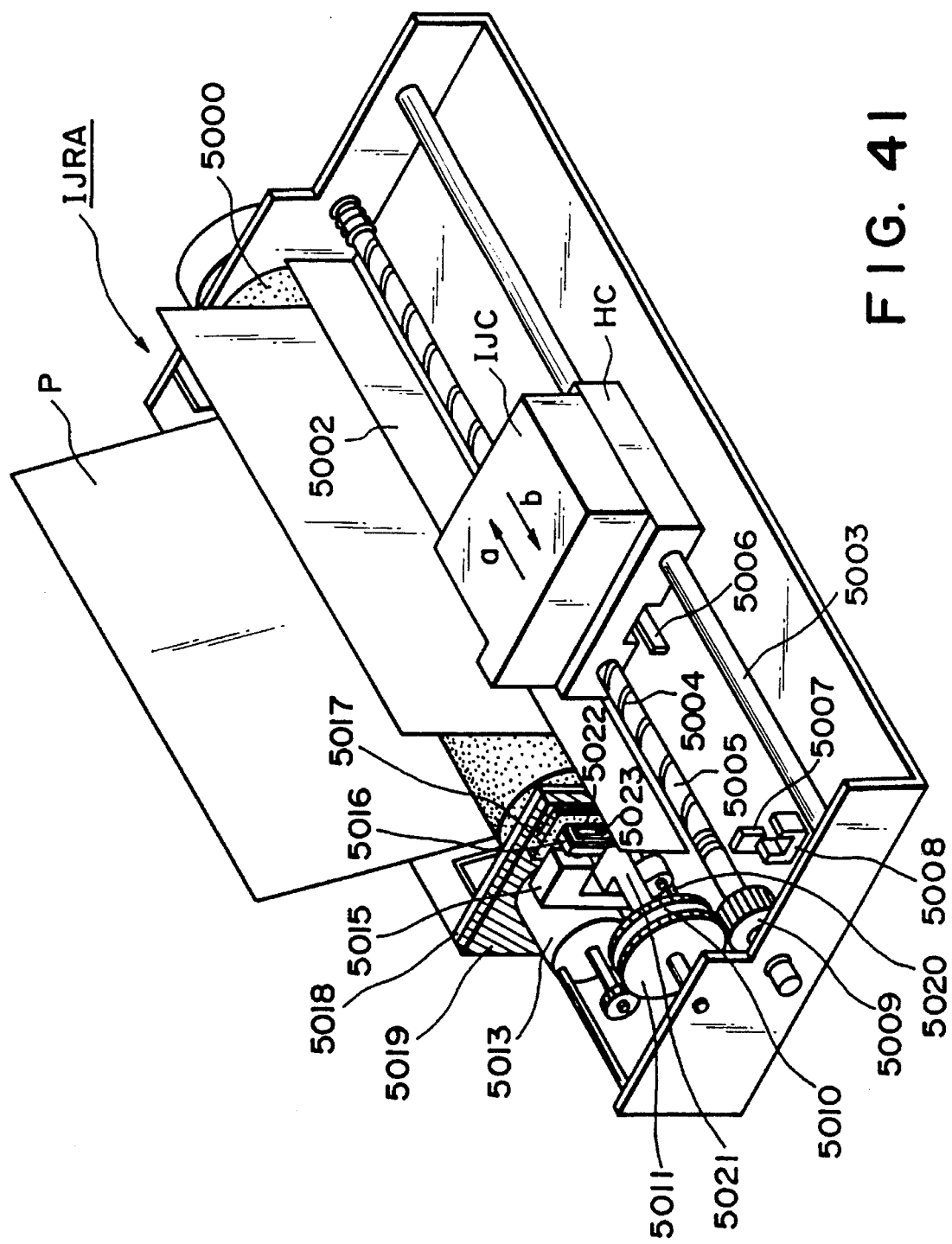
FIG. 41 is a perspective view of a major part of a recording apparatus using a recording head cartridge according to an embodiment of the present invention.

FIG. 41 is a perspective view of an ink jet recording apparatus IJRA in which the present invention is used. A lead screw 5005 rotates by way of drive transmission gears 5001 and 5009 by the forward and backward rotation of a driving motor 5013. The lead screw 5005 has a helical groove 5004 with which a pin (not shown) of the carriage Hc is engaged, by which the carriage Hc is reciprocable in directions a and b. A sheet confining plate 5002 confines the sheet on the platen over the carriage movement range.

Home position detecting means 5007 and 5008 are in the form of a photocoupler to detect presence of a lever 5006 of the carriage, in response to which the rotational direction of the motor 5013 is switched. A supporting member 5016 supports the front side surface of the recording head to a capping member 5022 for capping the recording head. Sucking means 5015 functions to suck the recording head through the opening 5023 of the cap so as to recover the recording head.

A cleaning blade 5017 is moved toward the front and rear by a moving member 5017. They are supported on the supporting frame 5018 of the main assembly of the apparatus. The blade may be in another form, more particularly, a known cleaning blade. A lever 5021 is effective to start the sucking recovery operation and is moved with the movement of a cam 5020 engaging the carriage, and the driving force from the driving motor is controlled by known transmitting means such as a clutch or the like.

The capping, cleaning and sucking operations can be performed when the carriage is at the home position by the lead screw 5005 in this embodiment. However, the present invention is usable in another type of system wherein such operations are effected at different timing. The recording apparatus is provided with electric signal supply means to supply electric signals to the recording head to effect the recording operation. The individual structures are advantageous, and in addition, the combination thereof is further preferable.

The recording apparatus of the present invention is provided with a recording signal applying means for supplying the signals for driving the recording head, and with a control means for controlling the recording apparatus.

The ink container has been described as a part of an ink jet head unit integrally having a recording head, but the ink container and the recording head may be separate members, in which the ink is supplied to the recording head through an ink pipe.

The description will be made as to an information processing apparatus using the present invention, and an electric circuit therefor.

Figure 42:
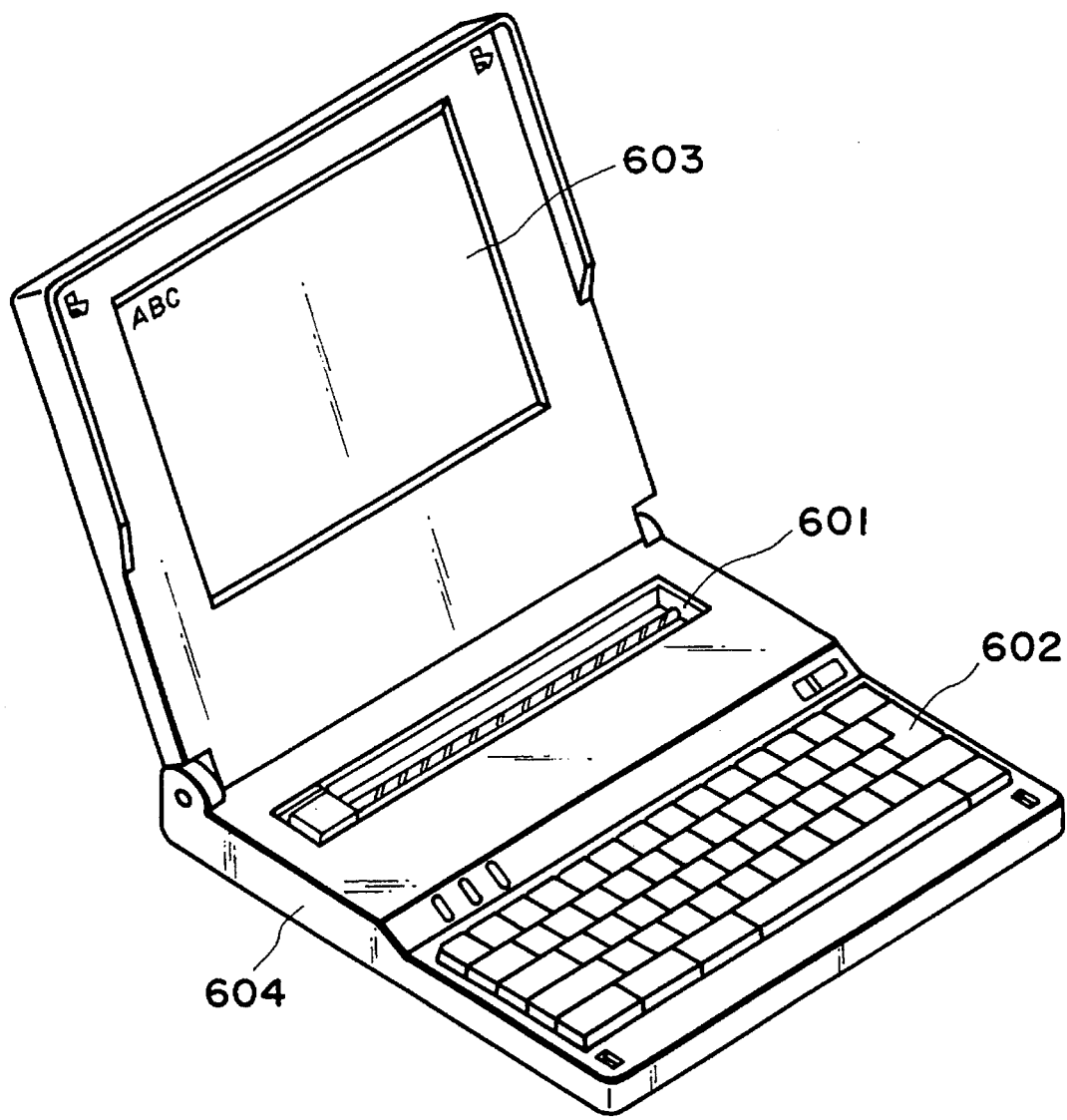
FIG. 42 is a perspective view of an information processing apparatus having a built-in recording apparatus according to an embodiment of the present invention.

FIG. 42 is a perspective view of the information processing apparatus 604 having the built-in recording apparatus of this invention.

Figure 43:
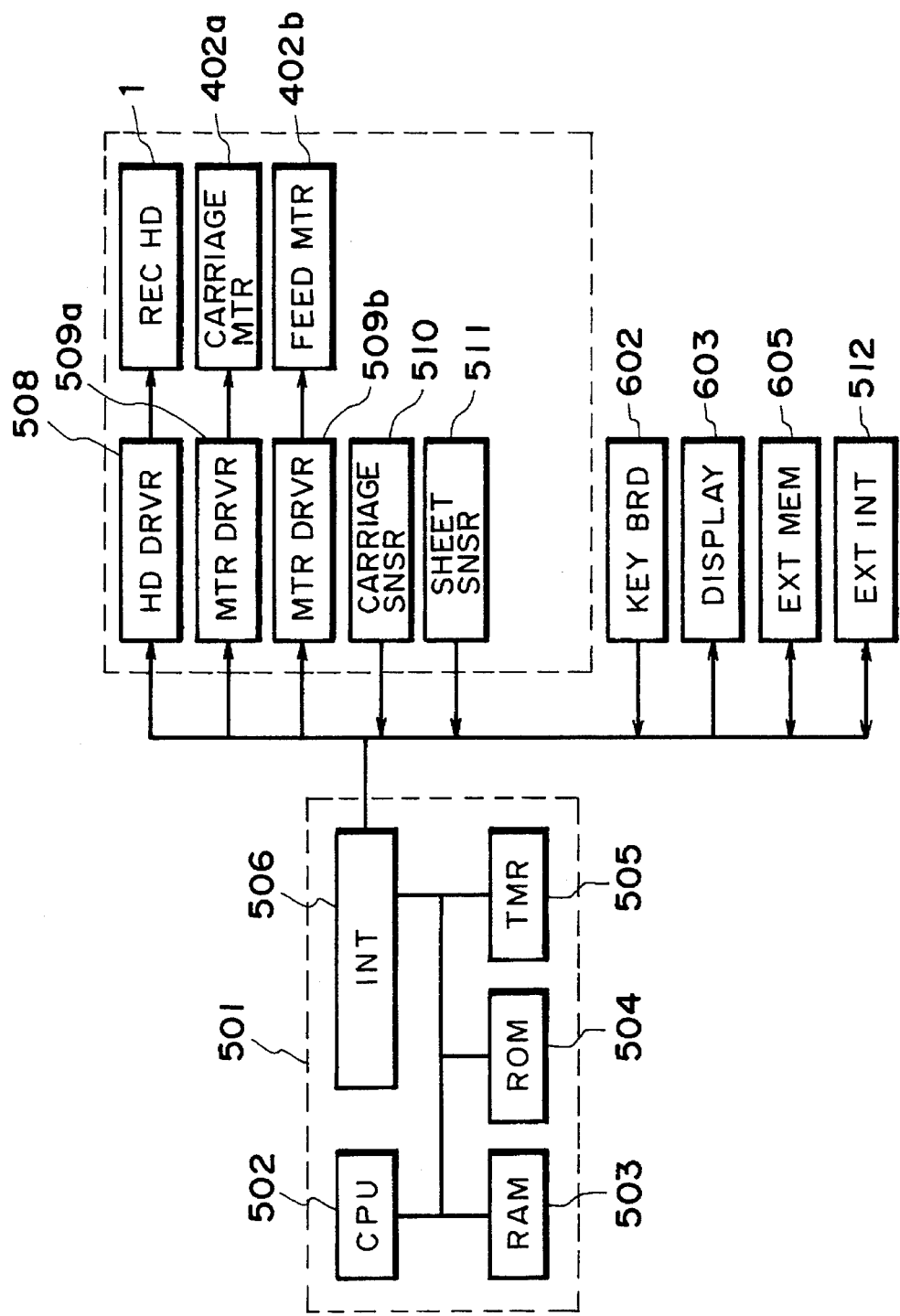
FIG. 43 is a block diagram of an electric circuit in the information processing apparatus according to an embodiment of the present invention.

The apparatus comprises the printer 601 described in the foregoing, a key board 602 having letter, character and figure input keys and command keys, and a display 603. FIG. 43 is a block diagram of the electric circuit of the information processing apparatus 604.

The electric circuit comprises a main controller 501, a CPU includes the feature of a microcomputer 502 for sequential operation control, a RAM having a working area or the area for the text data or image data, a ROM for storing programs for the sequential operation and fixed data such as font data, a timer 505 for producing execution cycles for the CPU 502 and for providing proper timing for the recording operation of the printer 601, and an interface 506 for connection of the CPU 502 with peripheral devices.

It further comprises a controller for the printer 601, a head driver 508 for supplying electric power and recording signals to the head cartridge 101, motor drivers 509a and 509b for supplying signals and electric power for driving the carriage motor 402a and feed roller 402b, a carriage sensor 510 for detecting position of the carriage 102 to determine, for example, whether the carriage is at the home position or not, and a paper sensor for detecting presence or absence of the recording material 6 to prevent recording operation outside the recording material, when, for example, the recording material is not fed or when the trailing end portion of the recording material has been recorded.

It further comprises an external memory 605 such as FDD, HDD or RAM card, and an external interface 512 for communication with another information processing apparatus 604 or for connection with the internal bus to control the peripheral device.

Although not shown in FIG. 43, there are voltage source for supplying electric power to the electric circuit, which may be in the form of a chargeable battery, dry battery or converter for conversion from AC power.

Figure 44:
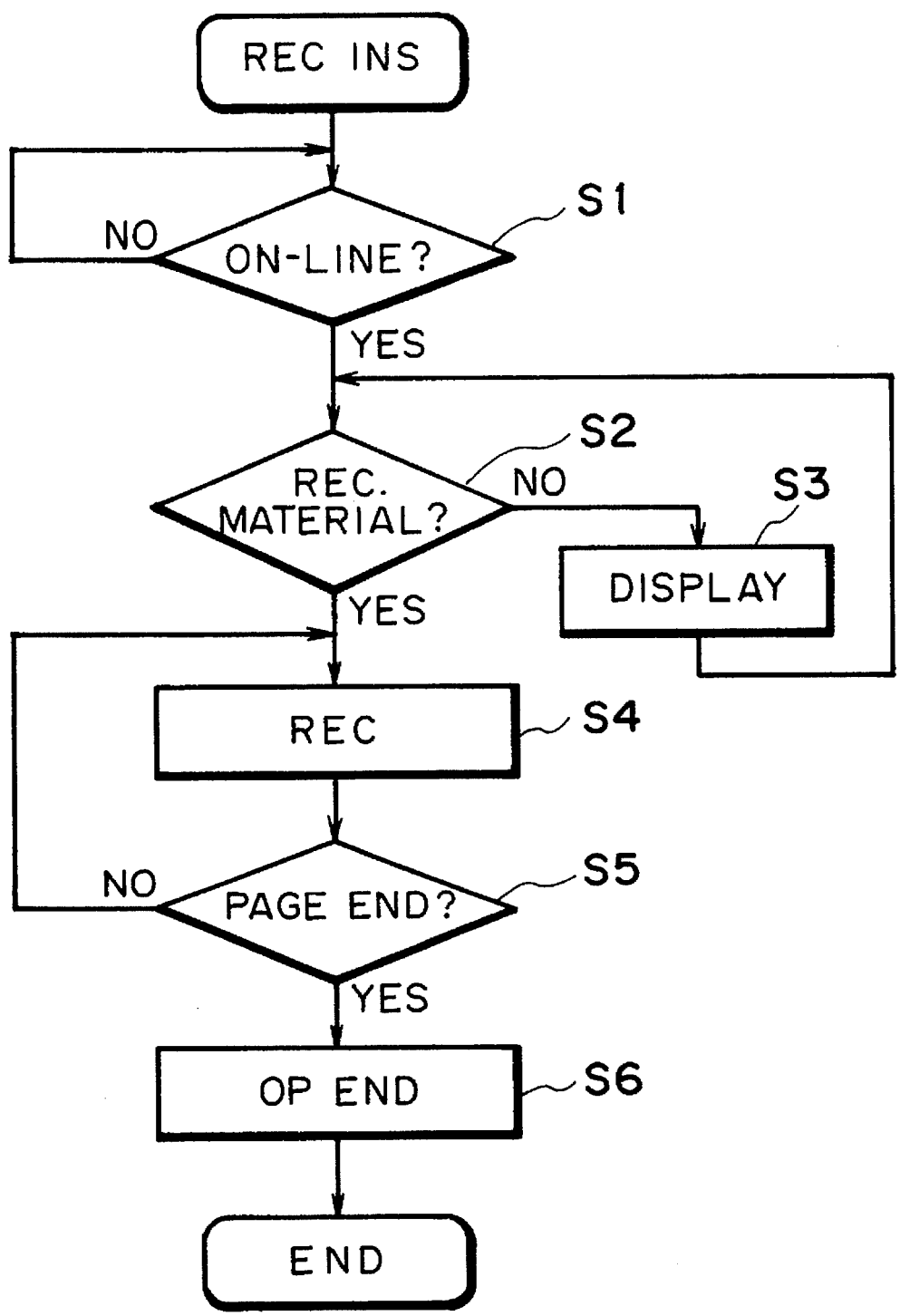
FIG. 44 is a flow chart of sequential recording operations in an apparatus according to an embodiment of the present invention.
Figure 45A:
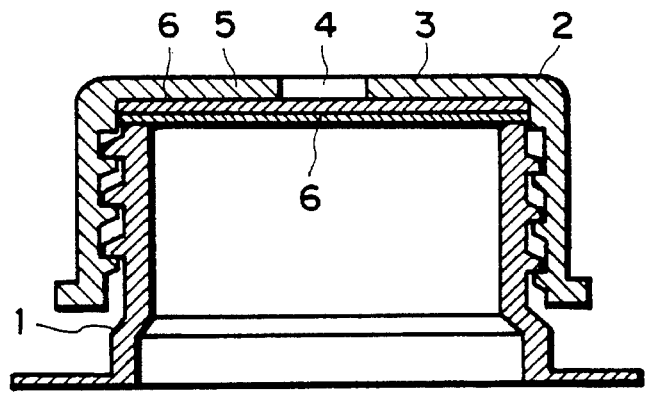
FIGS. 45A and 45B are sectional and top plan views of a conventional device.
Figure 45B:
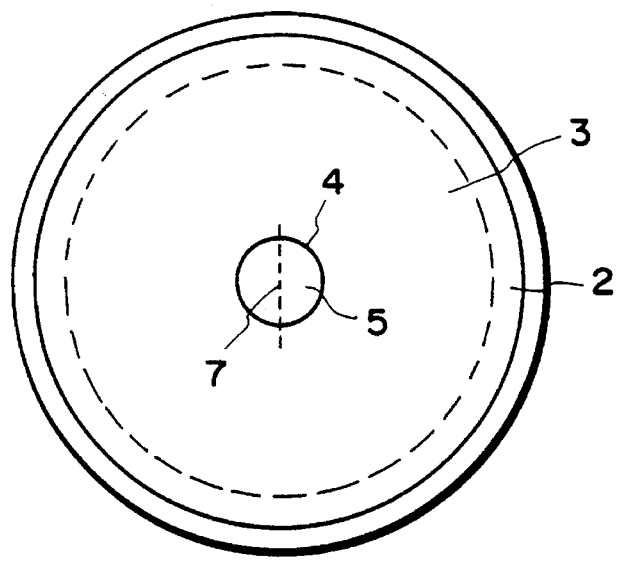
Figure 46:
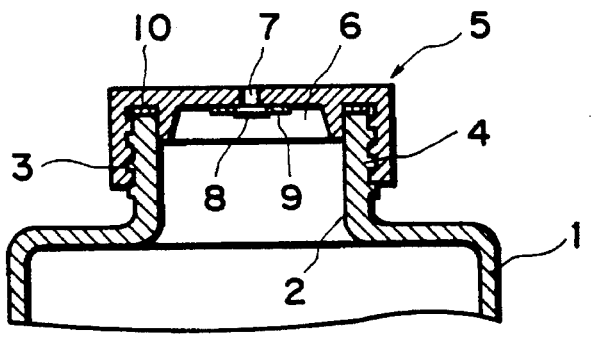
FIG. 46 is a sectional view of a conventional device.
Figure 47A:
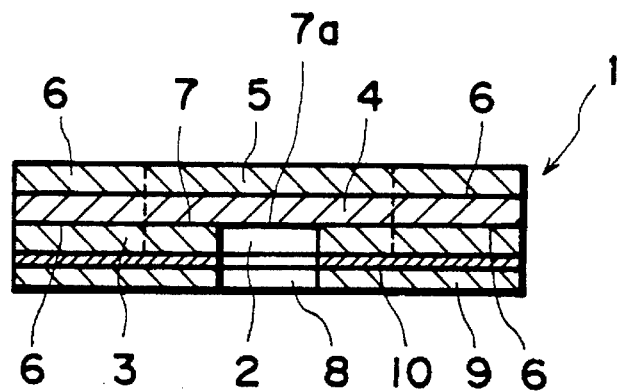
FIGS. 47A and 47B are sectional and top plan views of a conventional device.
Figure 47B:
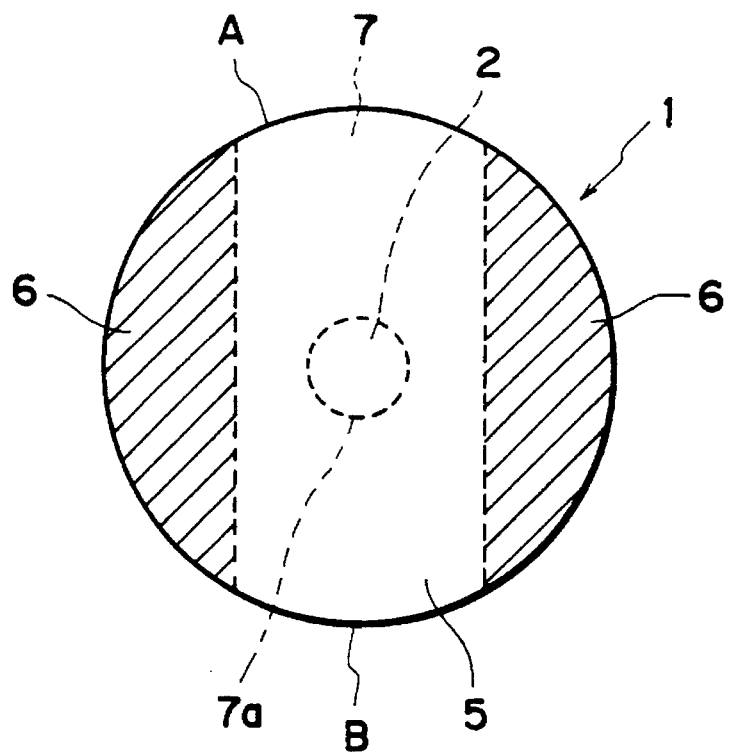
Figure 48:
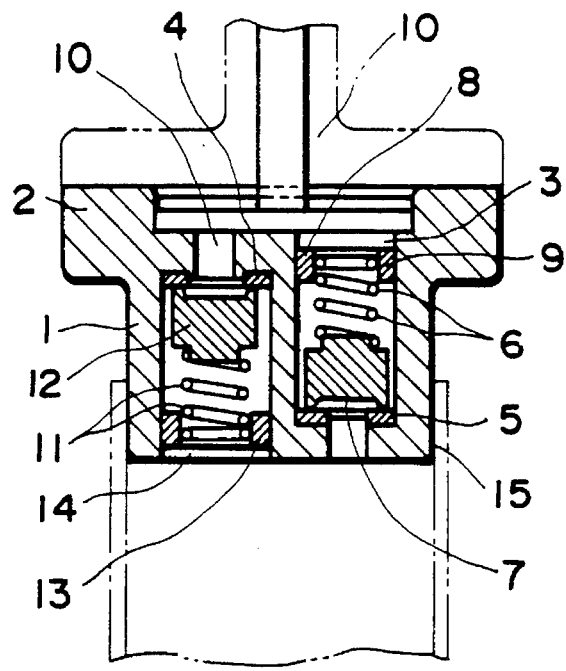
FIG. 48 is a sectional view of a conventional device.
Figure 49:
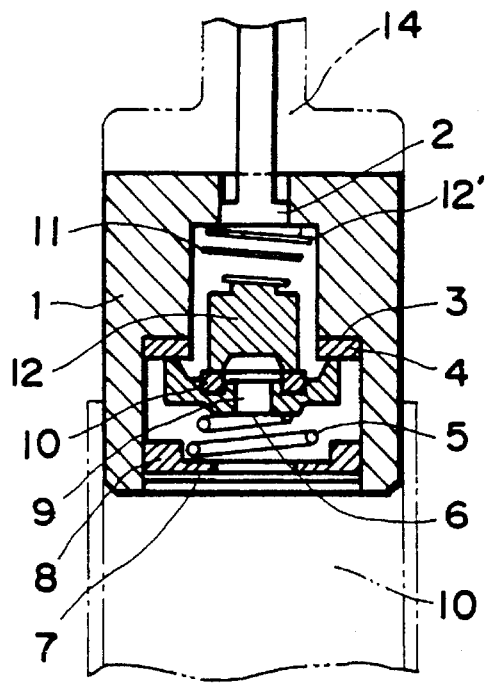
FIG. 49 is a sectional view of a conventional device.
Figure 50:
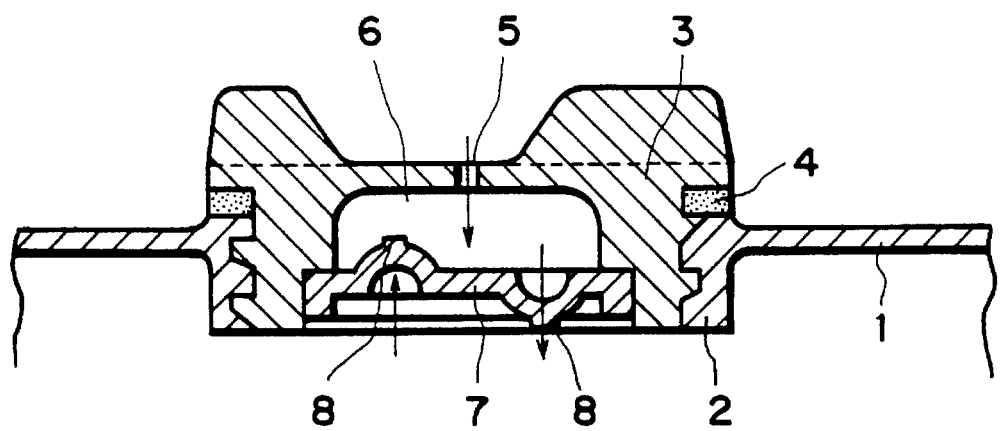
FIG. 50 is a sectional view of a conventional device.

Referring to FIG. 44, the sequential recording operation control will be described The following series of operations starts in response to record starting instructions from the key board or from the external record starting instructions through the interface.

First, the description will be made as to whether or not the display and the operation panel are in the on-line state, at step S1. This is done so as to avoid the start of the printing operation without sufficient preparation of the printer mainly when the record starting signal is transmitted from the outside by communication line or the like.

At step S2, the description will be made as to whether or not the recording material 6 is set in the printer on the basis of output of the paper sensor 511 or the like. This is done for the purpose of avoiding the scattering of the ink, contamination of the apparatus thereby and the wasteful consumption of the ink if the printing operation is started without the recording material.

At the step S2, the discrimination may be made as to whether the nip between the pinch roller 20 and the feed roller 201 is released or not, because if it is released, the recording material is not properly fed. For this discrimination, the release lever may be provided with a mechanical switch. If the recording material is not properly set, the operation proceeds to step S3.

At step S3, a message is given to the operator to promote setting of the recording material. The message may be in the form of light or sound.

If the proper setting of the recording material is discriminated at step S3, the operation proceeds to step 4, where the recording operation starts. In response to the instructions from the CPU 502, the head driver 508 drives the head cartridge 101, and in synchronism therewith, the motor drivers 509a and 509b drive the carriage motor 402a and the feed motor 402b. The recording operation is carried out with main scan direction movement of the carriage 102, subscan direction movement of the recording material and cleaning operation for the recording head 1.

At step S5, the termination of the recording operation is instructed from the CPU 502 or the like. Or when the page end or recordable range end comes, recording operation is completed.

In an ending step S6, the carriage 102 is returned to the home position, so that the recording head is capped to protect the ink ejection surface thereof in consideration of the possibility that the main switch is deactuated after the end of the recording. The recording material is discharged by driving the feed motor 402b through a predetermined amount or by driving the feed motor 402b until the sheet discharge is detected by the paper sensor 510. Then, the end of the recording operation is displayed on the display, or the signal indicative of the end is sent to the peripheral device.

In this embodiment, the recording head and the ink container are separable. They may be connected with each other on or off the carriage. Since the ink container is on the carriage, no tube for the ink supply is required, and the size of the apparatus can be reduced. When the ink becomes empty, only the ink container is changed, so that the running cost is reduced.

If one of the recording head or the ink container has to be exchanged, only that one is changed, so the apparatus is economical.

Where the recording head and the ink container are separated by lever or the like on the carriage, the separating speed can be controlled, so that the ink scattering from the ink supply port or the ink receptor port can be prevented. When the recording head and the ink container are separated on the carriage, it is not necessary to directly touch the recording head, and therefore, the ink ejection side surface of the recording head is not touched by the operator's finger, so the ejection side surface can be protected from contamination influential to the recording operation.

When the recording head and the ink container are separated on the carriage, the portion of the ink container which receives the force is limitedly determined, the mechanical strength may be made high only at such a portion. The other portion may have a smaller thickness so that the weight can be reduced, or the inside volume (capacity) can be increased. When the recording color is to be changed, the recording head and the ink container can be replaced as a unit, and therefore, the exchange operation is easy without the possibility of the color mixture.

The present invention is particularly suitably usable in an ink jet recording head and recording apparatus wherein thermal energy by an electrothermal transducer, laser beam or the like is used to cause a change of state of the ink to eject or discharge the ink. This is because the high density of the picture elements and the high resolution of the recording are possible.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response. The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the abovementioned patents. In addition, the present invention is applicable to the structure disclosed in Japanese Laid-Open Pat. Application No. 123670/1984 wherein a common slit is used as the ejection outlet for plural electrothermal transducers, and to the structure disclosed in Japanese Laid-Open Pat. Application No. 138461/1984 wherein an opening for absorbing pressure wave of the thermal energy is formed corresponding to the ejecting portion. This is because the present invention is effective to perform the recording operation with certainty and at high efficiency irrespective of the type of the recording head.

The present invention is effectively applicable to a so-called full-line type recording head having a length corresponding to the maximum recording width. Such a recording head may comprise a single recording head and plural recording head combined to cover the maximum width.

In addition, the present invention is applicable to a serial type recording head wherein the recording head is fixed on the main assembly, to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefor, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the a plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquified at the room temperature. Since the ink is controlled within the temperature not lower than 30° C. and not higher than 70°

C. to stabilize the viscosity of the ink to provide the stabilized ejection in usual recording apparatus of this type, the ink may be such that it is liquid within the temperature range when the recording signal in the present invention is applicable to other types of ink. In one of them, the temperature rise due to the thermal energy is positively prevented by consuming it for the state change of the ink from the solid state to the liquid state. Another ink material is solidified when it is left to prevent the evaporation of the ink. In either of the cases, the application of the recording signal producing thermal energy, the ink is liquified, and the liquified ink may be ejected. Another ink material may start to be solidified at the time when it reaches the recording material. The present invention is also applicable to such an ink material as is liquified by the application of the thermal energy. Such an ink material may be retained as a liquid or solid material in through holes or recesses formed in a porous sheet as disclosed in Japanese Laid-Open Pat. Application No. 56847/1979 and Japanese Laid-Open Pat. Application No. 71260/1985. The sheet is faced to the electro-thermal transducers. The most effective one for the ink materials described above is the film boiling system.

The ink jet recording apparatus may be used as an output terminal of an information processing apparatus such as computer or the like, as a copying apparatus combined with an image reader or the like, or as a facsimile machine having information sending and receiving functions.

As described in the foregoing, according to the present invention, the air valve is simple in the structure, and smoothly operates at the predetermined threshold pressure. The adjustment of the operating pressure is easy with high latitude. In the case of the bi-directional valve used, a very small valve mechanism can be accomplished.

In the liquid or ink container using the valve mechanism of this invention, the pressure in the ink container (in the space between the ink bladder and the ink container), and therefore, the pressure in the ink bladder, is determined by the difference of the operating pressures of the two valve mechanisms. By adjusting the two operating pressures of the two valves, the pressure of the ink can be maintained within a proper pressure range irrespective of the remaining quantity of the ink. For this reason, the liquid can be supplied stably.

In the foregoing embodiments, the valve is effective to control the air flow in the two directions. However, under the condition that the ambient condition change, such as the temperature change or pressure change, is small, the liquid container may have only one valve.

The valve of this invention is usable for a container for containing gasoline, lamp oil, volatile or flammable liquid or chemicals, if the size and configuration is properly modified, if the materials of the first container and the second container are properly selected and if the operating pressure or pressures are properly controlled in the manner described above. The valve is usable in the case that the stabilized supply of the liquid is desired. The use with the ink jet recording apparatus is particularly suitable, in that the fine adjustment of the operating pressure is possible for the maintenance of the meniscus and that the stabilized supply of the ink is possible irrespective of the degree of consumption of the ink.

In the liquid container using the valve mechanism of this invention, the liquid can be supplied out substantially with the predetermined pressure, irrespective of the remaining amount of the ink in the container, and in addition, the liquid accommodation volume is large, so that the efficient liquid container can be accomplished with stabilized liquid supply.

By using the efficient and stabilized liquid container with the recording head cartridge or the recording apparatus, the size of the elements can be reduced. The stabilized ink supply is effective to stabilize and improve the print quality.

When the bi-directional valve is used, the size of the element can be reduced.

Where the cut-away portions are formed in the thin film or the supporting portion, the stagnation of the sealing material is collected into the cut-away portion so that the valve operation is not influenced by the moved and stagnated sealing material. In addition, with this cut-away portion, when the thin film is bent by the pressure difference across the thin film, and the valve is opened thereby, the thin film is bent at the portion of the cut-away portion. For this reason, the limit pressure for the opening of the valve (releasing threshold pressure) is low.

Thus, the proper function of the valve can be maintained for long term. In addition, when it is used for the ink container for the ink jet recording apparatus, the releasing threshold pressure can be made low, and the difference between the releasing threshold pressure and the closing threshold pressure can be made small. This is significantly effective to avoid non-uniform record density, and to avoid the coarse record.

When the clearance maintaining mechanism is used between the thin film and the supporting portion (seat) of the valve, the operating pressure is maintained even after the valve is left on a shelf for a long period, and therefore, the stable operation is further assured.

As regards the valve having the protection member, if the side thereof faced to the thin film has a non-flat configuration, the thin film is prevented from attaching to the protection member even if the valve is used under a high temperature and high humidity condition. Thus, the operation is further stabilized.

While the invention has been described with reference to the structures disclosed herein, it is not confined to the details set forth and this application is intended to cover such modifications or changes as may come within the purposes of the improvements or the scope of the following claims.

What is claimed is:

1. A liquid container for containing liquid, comprising:

a first container for containing the liquid;

a second container for containing said first container therein;

a passage for supplying the liquid out from said first and second containers; and a valve mechanism, provided in said second container, having supporting means with a first opening, a first thin film, having a second opening smaller than the first opening, for covering the first opening, and a second thin film for covering the second opening, wherein said first thin film is seated on said supporting means with a sealing material therebetween, and said second thin film is seated on a side of said first thin film closer to said supporting means with said sealing material therebetween.

2. A container according to claim 1 wherein an operating pressure of said valve mechanism for releasing air to atmosphere outside said second container is higher than the operating pressure thereof for permitting introduction of air inside said, second container.

3. A liquid container according to claim 1, wherein said sealing material is silicone oil.

4. A recording head cartridge, comprising:

a recording head for ejecting ink in the recording operation; and an ink container for supplying ink to said recording head, said ink container comprising:

a first container for containing the liquid;

a second container for containing said first container therein;

a passage for supplying the liquid out from said first and second containers; and a valve mechanism, provided in said second container, having supporting means with a first opening, a first thin film, having a second opening smaller than the first opening, for covering the first opening, and a second thin film for covering the second opening, wherein said first thin film is seated on said supporting means with a sealing material therebetween, and said second thin film is seated on a side of said first thin film closer to said supporting means with said sealing material therebetween.

5. A recording head cartridge according to claim 4, wherein said sealing material is silicone oil.

6. A recording apparatus, comprising:

a recording head for ejecting ink in a recording operation;

an ink container for supplying ink to said recording head, said container comprising:

a first container for containing the liquid;

a second container for containing said first container therein;

a passage for supplying the liquid out from said first and second containers;

a valve mechanism, provided in said second container, having supporting means with a first opening, a first thin film, having a second opening smaller than the first opening, for covering the first opening, and a second thin film for covering the second opening, wherein said first thin film is seated on said supporting means with a sealing material therebetween, and said second thin film is seated on a side of said first thin film closer to said supporting means with said sealing material therebetween means for feeding recording material on which the recording operation is effected.

7. A recording apparatus according to claim 6, wherein said sealing material is silicone oil.

* * * * *

UNITED STATES PATENT AND TRADEMARK OFFICE
CERTIFICATE OF CORRECTION

PATENT NO. : 5,500,663

DATED : March 19, 1996

INVENTOR(S): TOSHIHIKO UJITA ET AL.

It is certified that error appears in the above-identified patent and that said Letters Patent is hereby corrected as shown below:

ON COVER PAGE

At [56] References Cited:

"4,311,124 1/1982 Hara" should read
--4,313,124 1/1982 Hara--.

COLUMN 1

Line 23, "disclose" should read --discloses,--.
Line 38, "permits" should read --permit--; and "permit" should read --permits--.
Line 54, "(unidirectional)" should read --(unidirectional).--.

COLUMN 2

Line 25, "recoring" should read --recording--.
Line 29, "recoring" should read --recording--.
Line 61, "a" should be deleted.
Line 62, "to" should read --to a--.

COLUMN 3

Line 16, "opening" should read --opening; and--.

COLUMN 6

Line 41, "of the" should read --the--.

UNITED STATES PATENT AND TRADEMARK OFFICE
CERTIFICATE OF CORRECTION

PATENT NO. : 5,500,663

DATED : March 19, 1996

INVENTOR(S) : TOSHIHIKO UJITA ET AL.

It is certified that error appears in the above-identified patent and that said Letters Patent is hereby corrected as shown below:

COLUMN 7

Line 48, "is" should be deleted.

COLUMN 8

Line 33, "all" should be deleted.
    Line 62, "dimensional" should read --dimensions--.

COLUMN 12

Line 32, "portion" should read --portions--.
    Line 34, "portion" should read --portions--.

COLUMN 14

Line 5, "facing to" should read --facing--.

COLUMN 19

Line 44, "are" should read --is--
    Line 48, "the the" should read --the--.

COLUMN 20

Line 6, "placed" should read --is placed--.
    Line 34, "is" should read --are--.
    Line 59, "When" should read --With--.

UNITED STATES PATENT AND TRADEMARK OFFICE
CERTIFICATE OF CORRECTION

PATENT NO.   : 5,500,663

DATED        : March 19, 1996

INVENTOR(S)  : TOSHIHIKO UJITA ET AL.

It is certified that error appears in the above-identified patent and that said Letters Patent is hereby corrected as shown below:

COLUMN 22

Line 32, "described" should read --described.--

COLUMN 24

Line 54, "the" should be deleted.

COLUMN 26

Line 60, "claim 1" should read --claim 1,--.
    Line 64, "said," should read --said--.

COLUMN 28

Line 17, "ther-" should read --there- --.
    Line 18, "ebetween" should read --between; and--.

Signed and Sealed this

Eighth Day of October, 1996

Attest:

BRUCE LEHMAN

*Attesting Officer*     Commissioner of Patents and Trademarks